United States Patent [19]
Taue et al.

[11] Patent Number: 5,845,618
[45] Date of Patent: Dec. 8, 1998

[54] ENGINE FOR TRANSPORT VEHICLE

[75] Inventors: Jun Taue; Masahisa Kuranishi, both of Iwata, Japan

[73] Assignee: Yamaha Hatsudoki Kabushiki Kaisha, Iwata, Japan

[21] Appl. No.: 841,522

[22] Filed: Apr. 23, 1997

[30] Foreign Application Priority Data

Apr. 23, 1996 [JP] Japan .................................. 8-101117

[51] Int. Cl.⁶ .................................................... F02B 75/02
[52] U.S. Cl. ............................................ 123/317; 123/311
[58] Field of Search ................................... 123/311, 317, 123/318, 76

[56] References Cited

U.S. PATENT DOCUMENTS

| | | | |
|---|---|---|---|
| 1,477,363 | 12/1923 | Kessler | 123/76 |
| 1,725,418 | 8/1929 | Prindle | 123/306 |
| 5,230,314 | 7/1993 | Kawahara et al. | 123/317 |
| 5,377,634 | 1/1995 | Taue | 123/317 |
| 5,678,525 | 10/1997 | Taue | 123/73 A |
| 5,738,051 | 4/1998 | Binversie et al. | 123/80 BA |

*Primary Examiner*—David A. Okonsky
*Attorney, Agent, or Firm*—Knobbe, Martens, Olson & Bear LLP

[57] ABSTRACT

A number of embodiments of vehicles such as scooters that are powered a compact, high performance, four-cycle crankcase compression supercharged internal combustion engine. The engine is provided with two throttle valves, one on the intake side and one on the compressor side, that are operated simultaneously and in the same direction under at least some conditions so as to improve throttle response. In addition, an arrangement is provided for limiting the maximum pressure in the compressor side under low throttle and low load conditions. This improves performance and ensures against seal degradation in the lubricating system.

14 Claims, 29 Drawing Sheets

ENGINE FOR TRANSPORT VEHICLE

BACKGROUND OF THE INVENTION

This invention relates to an engine for a transport vehicle and more particularly to proved compact, high output, crankcase compression, four-cycle internal combustion engine for utilization in the operation of transport vehicles.

There are a wide variety of vehicle types in which it is desirable to provide an internal combustion engine that is compact and which provides a high specific power output. In many instances, two-cycle engines employed for such vehicles because they have these engine characteristics. However, for a variety of reasons, the utilization of two-cycle engines may not be desirable in many instances. That is, the generally poor emission control and high overlap between the scavenge and exhaust cycles may not always be desirable or may not always provide the desired power characteristics.

There has been desired, therefore, an engine of a type of which operates on a four-cycle principal and which is nevertheless compact and which can provide a high specific power output. To achieve these goals there has been proposed a type of engine as depicted in U.S. Pat. No. 5,377,634, entitled "Compressor System For Reciprocating Machine", issued Jan. 3, 1995 in the name of one of the inventors hereof and assigned the assignee hereof. This type of engine has a number of advantages because of its high specific output and its relatively compact nature.

With this type of engine, an induction system generally supplies at least an air charge to the crankcase chamber of the engine. This charge is compressed in the crankcase chamber by the operation of the piston and connecting rod cooperating with the crankcase. The compressed charge is then delivered to the intake side of the engine through a pressure conduit. Because the intake valve only opens every other stroke, a compressed charge is delivered to the combustion chamber and a high specific output can be achieved without providing an external compressor.

Although this type of engine has these advantages, the positioning of the throttle valve for controlling the speed of the engine can present some problems. For example, if the throttle valve is placed in the induction side of the engine charging system, then the throttle valve is disposed quite a distance from the combustion chamber and this may result in slow response during transient conditions. This can present difficulties in having smooth acceleration and/or deceleration. Also, when the throttle valve is positioned far from the charge forming system, then there may be lags in the matching of the fuel air ratio to the desired amount.

If the throttle valve is positioned in the pressure side, then a condition may arise where high pressures are existent under low load and low speed conditions and this can present some problems. Also high pumping losses can arise under some running conditions.

It is, therefore, a principal object of this invention to provide an improved throttle valve arrangement for such engines.

It is a further object of this invention to provide a throttle valve arrangement for crankcase compression, supercharged, four-cycle engines wherein the throttle valve response is good and uniform air fuel ratio will result under substantially all running conditions.

Another potential difficulty with such engines is that the pressure on the pressure side may be higher than desirable under some running conditions. This is particularly true if the charge into the combustion chamber is restricted under lower speeds and lower loads. This will provide a condition wherein a high pressured charge is maintained in the pressure delivery side of the engine. This can cause the potential of reverse pressures in the lubricating system which can adversely affect the seals and also can adversely affect the performance of the engine on deceleration.

It is, therefore, a still further object of this invention to provide an improved pressure control system for a crankcase compression four-cycle internal combustion engine.

SUMMARY OF THE INVENTION

The features of the invention are adapted to be embodied in a four-cycle, crankcase compression, internal combustion engine that is comprised of a cylinder block having a cylinder bore with a crankcase chamber formed at one end thereof. A cylinder head closes the other end of the cylinder bore. A piston reciprocates in the cylinder bore and forms with the cylinder bore and cylinder head a combustion chamber. A crankshaft is rotatably journaled in the crankcase chamber. A connecting rod couples the piston to the crankshaft for transmitting motion therebetween. Means are provided for forming a seal between one end of the connecting rod and the piston and between the sides of the connecting rod and the side surfaces of the crankcase chamber. The connecting rod has a portion thereof that is in sealing engagement with the crankcase during at least a portion of a single rotation of the crankshaft for the dividing the crankcase chamber into a variable volume chamber formed solely by the piston, the connecting rod, the crankshaft and the crankcase chamber for operating as a positive displacement pump. Intake means admit an air charge to the crankcase chamber. Pressure delivery means discharge a compressed air charge from the crankcase chamber. The cylinder head has an intake port for serving the combustion chamber. Compressor supply means supply a compressed charge from the pressure delivery means to the intake port. An intake passage is formed in the cylinder head for discharging exhaust products from the combustion chamber.

In accordance with a first feature of the invention, a first throttle valve is positioned in the intake means for controlling the flow therethrough. A second throttle valve is positioned in the compressor supply means for controlling the flow therethrough. A throttle control means is provided for operating each of the throttle valves for effecting movement of the throttle valves in the same direction during at least a portion of their movement.

In accordance with another feature of the invention, there is provided a bypass passage between the compressor supply means and the intake means. A first throttle valve is positioned in the intake means for controlling the flow therethrough and a second throttle valve is positioned in the bypass means for controlling the flow therethrough. A throttle control means is provided for operating the throttle valves so that they move in opposite directions during at least a portion of the movement of the first throttle valve.

DETAILED DESCRIPTION OF THE PREFERRED EMBODIMENTS OF THE INVENTION

Figure 1:
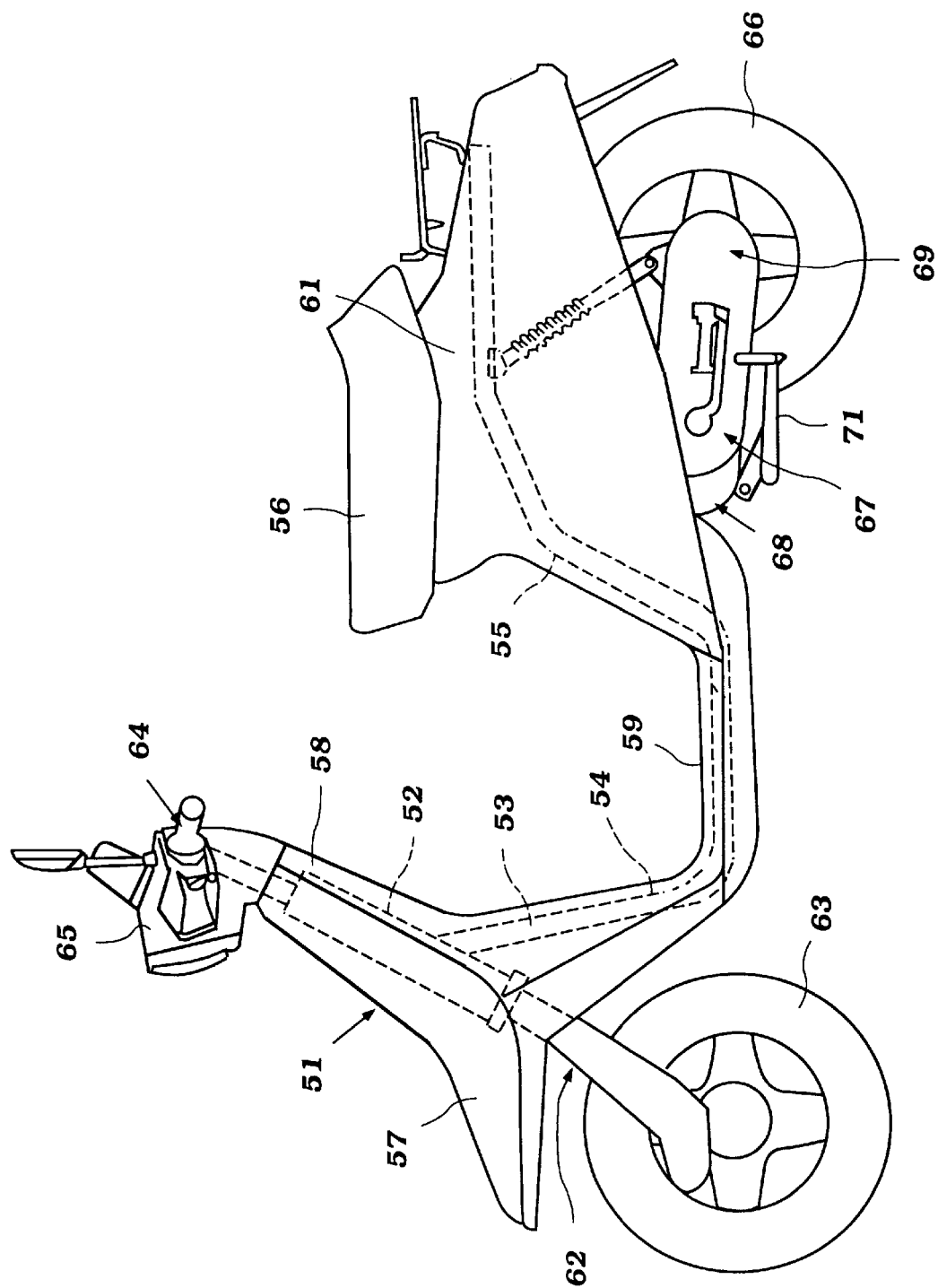
FIG. 1 is a side elevational view of a motor scooter constructed in accordance with a first embodiment of the invention.

Referring now in detail to the embodiment of FIGS. 1–7 and initially primarily to FIG. 1, a vehicle powered by an engine constructed in accordance with an embodiment of the invention is identified generally by the reference numeral 51. In the illustrated embodiment, the vehicle 51 is a motor scooter. Although the engines which embody the invention may be employed for a wide variety of purposes, they have particular utility with vehicles or other applications wherein a compact engine construction having a high specific output is desirable. Hence, the motor scooter 51 is an ideal type of application for the invention. As will become apparent to those skilled in the art, however, the invention may be utilized in conjunction with a wide variety of types of propulsion systems.

The scooter 51 is comprised of a frame assembly, that includes a head pipe 52 that is supported by a down tube 53 that extends downwardly and then branches rearwardly to a pair of horizontally extending back bone frame members 54 that extend along the lower portion of the scooter 51 and on opposite sides thereof. At the rear ends, these frame members 54 extend upwardly as at 55 to form a support for a seat 56.

The frame assembly is concealed within a body that is comprised of a front cowling that consist of a forward part 57 and rearward part 58 which encircle and enclose the head pipe 52 and the down tubes 53. A floor board 59 extends across the upper ends of the horizontal portions of the frame members 54 and provides a foot rest for a rider seated on the seat 56. The rear portion of the frame assembly is covered by a rear body assembly 61 that may be comprised of a pair of side parts that are connected to each other.

A front fork 62 supports a front wheel 63 for rotation and dirigible movement hithin the head pipe 52. The front fork 62 is steered by a handle bar assembly 64 in a well known manner. A handle bar cover or shroud 65 encircles the handlebar assembly 64.

A rear wheel 66 is journaled at the rear end of the frame assembly and driven in a manner which will be described. This include a propulsion unit 67 which drives the rear wheel 66. The propulsion 67 is comprised of a powering internal combustion engine, indicated generally by the reference numeral 68 and which will be described in more detail later. This engine 68 drives the rear wheel 66 through a transmission 69 the construction of which will also be described later.

As will become apparent, this transmission 69 includes a continuously variable belt-type transmission and a step down gear transmission so as to drive the rear wheel 66 at an appropriate speed and ratio.

A kick stand 71 is also supported by the frame on the underside of the propulsion unit 67 for stationary support of the scooter 51 when it is not in use.

Figure 2:
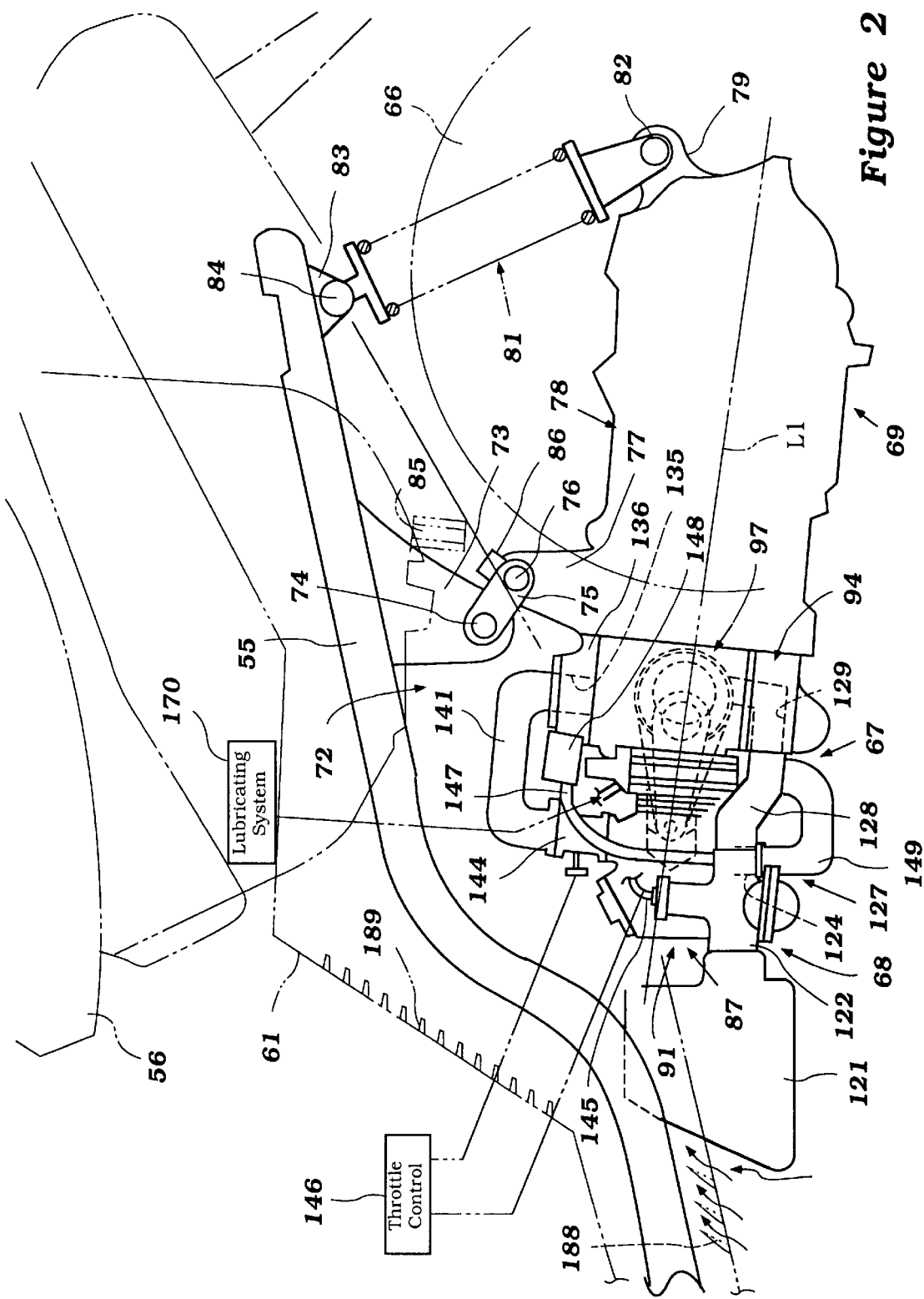
FIG. 2 is an enlarged side elevational view of a portion of the motor scooter shown in FIG. 1 illustrating the propulsion unit and its mounting arrangement in solid lines and other related components of the motor scooter in phantom lines.

The suspension system for the rear wheel 66 and the propulsion unit 67 will now be described by primary reference to FIG. 2 although this structure also appears in FIG. 1. This suspension system is indicated generally by the reference numeral 72 and includes a mounting bracket 73 carried by the fame members 55 and which supports a pivot pin 74. The pivot pin 74 journals a suspension link 75. This pivotal connection includes a resilient bushing so as to control the relative pivotal movement of the link 75 about the pivot pin 74.

The link 75 further carries a pivot pin 76 which provides a pivotal connection to a lug 77 of a transmission case, indicated generally by the reference numeral 78 and which forms the outer protective housing of the rear wheel drive transmission 69.

The transmission case 78 further has rearwardly positioned lug 79 to which one end of a suspension unit 81 is pivotally connected by means of a pivot pin 82. The suspension unit 81 is comprised of a tubular type, hydraulic shock absorber assembly and surrounding a coil compression spring.

The other end of the suspension unit 81 is connected to a further bracket 83 mounted at the rear of the frame members 55 by a further pivotal connection 84. Hence, relative suspension movement of the rear wheel 66 and the propulsion unit 67 is possible about the pivot axis defined by the pivot pin 76 and that of the link 75 about the pivot pin 74.

The maximum degree of such pivotal movement in the upward direction is limited by an elastic damper 85 that is carried also in proximity to the bracket 73 and is engaged by a lug 86 of the link 75 so as to limit the upward pivotal movement when the scooter 51 is supported on the kick stand 71.

The construction of the engine 68 will now be described by primary reference to FIGS. 2–6. The engine 68 in this embodiment is depicted as being of the single cylinder air cooled type. As will be readily apparent from the following descriptions of other embodiments, the engine may be totally air cooled or partially air cooled and partially water cooled or totally water cooled. Also, although the invention is described primarily in conjunction with single cylinder embodiments, it will be readily apparent to those skilled in art how the invention can be utilized with multiple cylinder engines.

Finally, although the construction of the engine 68 will be described in some detail, where any details of the engine are not illustrated or described, for example details of the sealing system for the crankcase compression arrangement, reference may be had to aforenoted U.S. Pat. No. 5,377,634 for the details of the construction. Other components will also be described by reference to a copending application Basically, the engine 68 is comprised of a cylinder block, indicated generally by the reference numeral 87 which defines a cylinder bore 88. In this embodiment, the engine 68 is positioned in the chassis so that under normal loading conditions, the axis of the cylinder bore, indicated by the line L-1 in FIG. 2 is disposed at a relatively shallow forwardly upwardly inclined acute angle to the horizontal. The reasons for this will be described later. The external surface of the cylinder block 87 is provided with cooling fins 89 and air is circulated there across in a manner which will be described for cooling of the engine.

One end of the cylinder bore 88 is closed by a cylinder head assembly, indicated generally by the reference numeral 91 and which is affixed to the cylinder block 87 in a known manner. The cylinder head 91 is formed with a recess 92 that cooperates with the cylinder bore and a piston 93 that is slidably supported therein so as to form the combustion chamber for the engine. At times, the cylinder head recess 92 will be referred to as the "combustion chamber" since, at top dead center, it forms the substantial portion of the clearance volume of the engine.

The end of the cylinder bore 88 opposite to the cylinder head 91 is closed by a crankcase assembly, indicated generally by the reference numeral 94. This crankcase assembly 94 is comprised of a main crankcase member 95 that has a bore which is complementary to and receives a cylindrical extension of the lower end of the cylinder block 87. This crankcase member 95 is suitably connected to a further crankcase member 96 which together form a crankcase chamber in which a crankshaft, indicated generally the reference numeral 97 is supported for rotation in a manner which will be described. As will also be described, the crankcase chamber, indicated generally by the reference numeral 98 is generally sealed by the operation of the various components so that it can operate as a compressor in the manner described in aforenoted U.S. Pat. No. 5,377,634.

A connecting rod, indicated generally by the reference numeral 99 has a pivotal connection at its small end by means of a piston pin 101 to the piston 93. The piston 93 is formed with a recess and the small end 102 of the connecting rod 99 forms a seal between the piston 93 and the connecting rod 99 in the manner described in the aforenoted patent.

The big end of the connecting rod 99 is journaled on a throw 102 of the crankshaft 97 in a well known manner which will also be described in more detail later.

Figure 4:
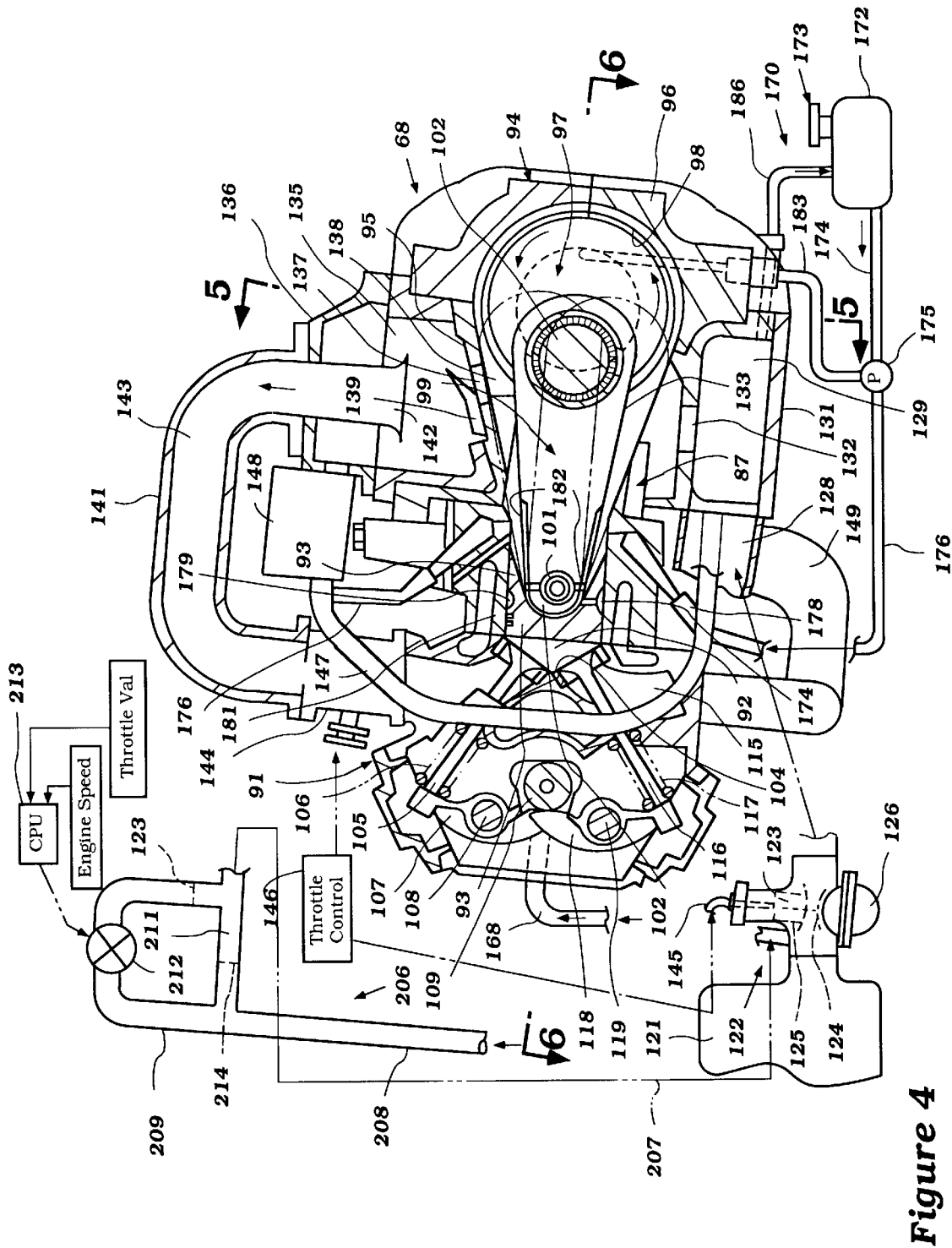
FIG. 4 is a cross-sectional view looking generally in the same direction as FIG. 2 and shows the internal components of the engine of the propulsion unit and the relationship of other parts thereof in solid lines.
Figure 5:
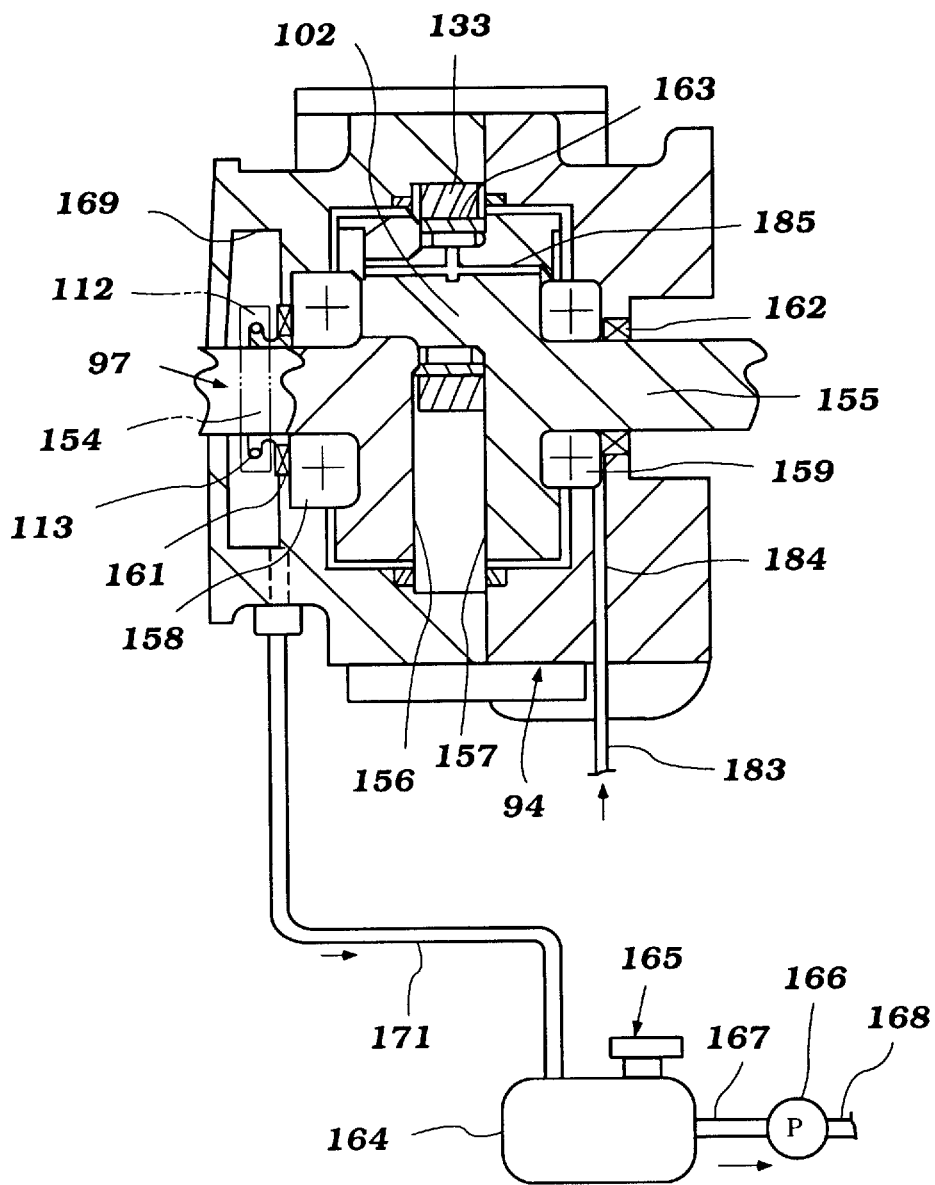
FIG. 5 is a cross-sectional view taken along the line 5—5 of FIG. 4 and shows the details of the crankshaft lubrication system.

The connecting rod 99 is configured so that its side surfaces, looking in the direction perpendicular to FIG. 4, will contact and seal with the sides of the crankcase members 95 and 96 so as to provide a further seal in the crankcase. At times, the end of the connecting rod, indicated at A, will sealingly engage the crankcase 98 so as to define a pair of variable volume chambers which vary in volume cyclically as the engine reciprocates so as to function as a compressor as described also in more detail in the aforenoted patent.

The engine 68 operates on a four-cycle principal and thus, there is provided in the cylinder head assembly 91 both an intake and an exhaust system for admitting an air and/or fuel charge to the combustion chamber 92 and for discharging the burnt charge therefrom to the atmosphere. This system includes at least one intake passage 103 which, in this embodiment, is formed in the upper end of the cylinder head assembly 91. This intake passage 103 terminates in an intake port 104 that is valved by means of a poppet-type intake valve 105 that is slideably supported in the cylinder head assembly 91 in a known manner and as is described in the aforenoted U.S. Pat. No. 5,377,634.

A coil compression spring assembly 106 urges the intake valve 105 to its closed position. The intake valve 105 is open by means of an intake rocker arm 107 which is journaled in the cylinder head assembly on an intake rocker arm shaft 108. This rocker arm 107 is operated by the intake lobe of a camshaft 109 that is journaled in the cylinder head 91 in an appropriate manner, this construction being best shown in FIG. 6.

Figure 6:
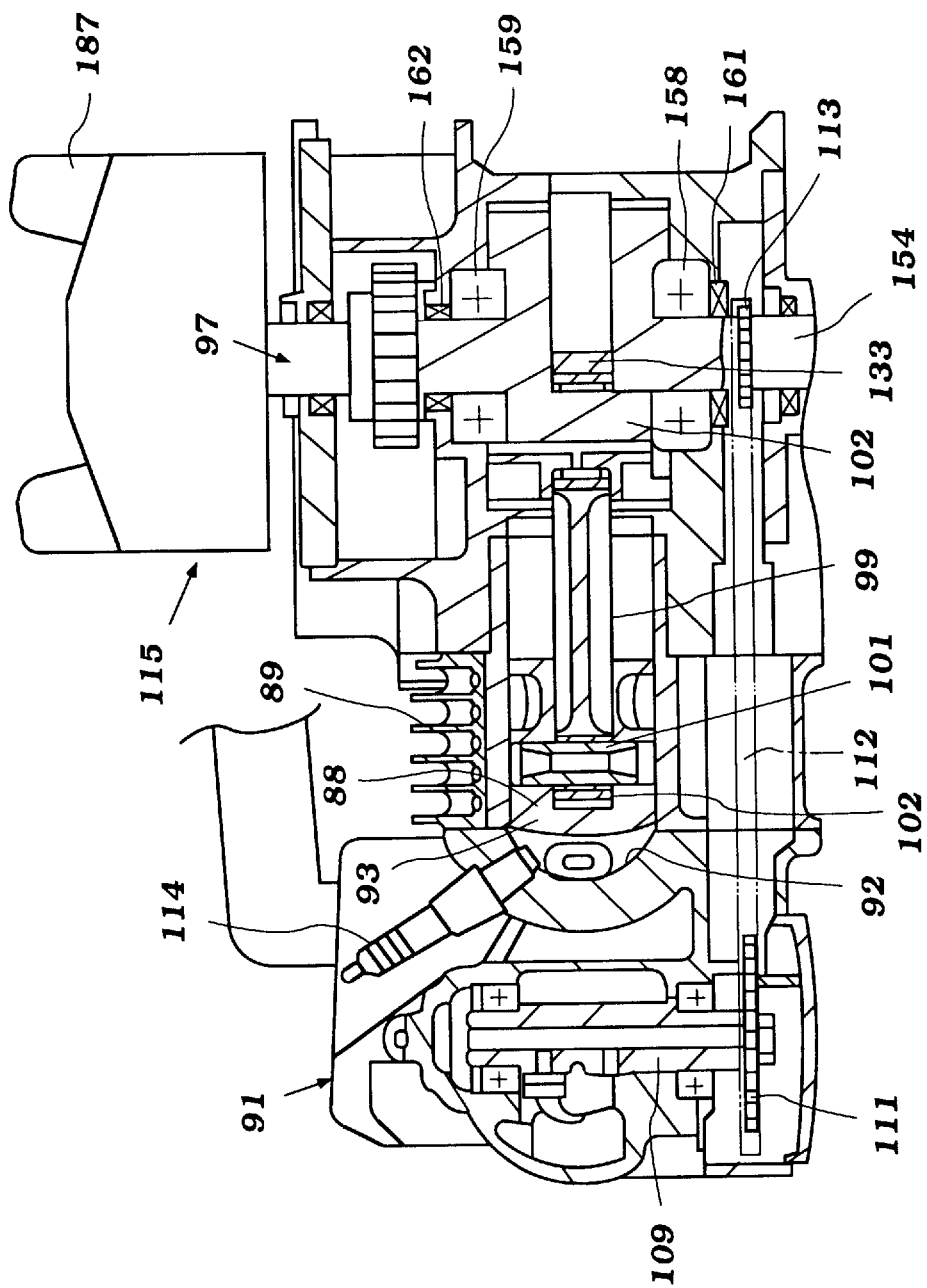
FIG. 6 is a cross-sectional view taken along the line 6—6 of FIG. 4.

The camshaft 109 is driven at one-half crankshaft speed by means of a timing drive that appears best in FIG. 6 and which is comprised of a driving sprocket 111 which is affixed to the lower end of the camshaft 109. This sprocket 111 is driven by a chain 112 which engages a driving sprocket 113 that is affixed to the lower end of the crankshaft 97.

As seen in FIG. 6, a spark plug 114 is mounted in the cylinder head assembly 91 so that its gap extends into the combustion chamber recess 92. The spark plug 114 is fired by means of a magneto generator assembly associated with a flywheel magneto 115 that is affixed to and driven off of one side of the crankshaft 97.

Referring again to FIG. 4, the charge which has been burned upon firing of the spark plug 114 is discharged through an exhaust passage 115 formed in the cylinder head 91 on the side opposite the intake passages 113. The exhaust passage 115 is valved by a poppet-type exhaust valve 116 that is slideably supported in the cylinder head assembly 91. The exhaust valve 116 is urged to its closed position by a coil compression spring 117.

The exhaust valve 116 is opened by an exhaust rocker arm 118 that is pivotally mounted in the cylinder head 91 on an exhaust rocker arm shaft 119. This rocker arm 118 is operated by an exhaust lobe of the camshaft 109 in a known manner.

An induction system is provided for supplying an air charge and, in the illustrated embodiments, a fuel charge to the crankcase chamber 98 for a compression therein. This induction system is comprised of, in this embodiment, an air filter or air inlet device 121 that is mounted at the lower end of the body of the motorcycle in an area where it can draw fresh cool air, that is inducted in a manner to be described. This air inlet device 121 may be provided with an air filter and/or air silencer arrangement.

This filtered and/or silenced air charge is then delivered from the air inlet device 121 to a charge former in a form of a carburetor 122. The carburetor 122 has suitable fuel supply circuits that are controlled in a known manner by a sliding piston-type throttle valve 123. This throttle valve 123 cooperates with an intake passage 124 of the carburetor body 122 so as to provide a variable flow area. In addition, a metering rod 125 cooperates with a metering jet (not shown) so as to providing the desired fuel air ratio in response to the operator demand.

Fuel as supplied to a fuel bowl 126 formed at the lower end of the carburetor 122 by a fuel supply system which may be of any known type. The pressure in the fuel bowl 126 is controlled in a manner which will be described later by reference to FIG. 4.

The fuel air charge mixed by the carburetor 122 is then delivered through an inlet means 127 which includes an intake pipe 128 that registers with the downstream end of the carburetor 122 and which supplies the fuel air charge to an intake chamber 129 formed at one side of a crankcase assembly 94. This intake chamber 129 is comprised of a plenum volume that is formed in the side of the crankcase assembly 94 and which is closed by a closure plate 131.

An intake port 132 communicates this chamber 129 with the crankcase chamber 98 and is opened and closed by a side 133 of the connecting rod 99 in the manner described in the aforenoted patent. Hence, as the crankshaft 97 rotates, the intake port 132 will be selectively opened and closed so as to permit a fuel air charge to be drawn into and compressed in the crankcase chamber 98.

On the upper side of the crankcase assembly 94 there is a provided a pressure accumulator chamber or compressor chamber 135. This chamber 135 is formed by a recess formed in the side of the crankcase assembly 94 and which is closed by a closure plate 136. A compressor port 137 communicates the pressure side 138 of the crankcase chamber with the chamber 135. A reed-type check valve 139 permits the exiting of the compressed charge from the crankcase chamber portion 138 into the compressor chamber 135 and precludes reverse flow. Hence, since there are two compression strokes per firing stroke, a compressed charge will be supplied into the compressor chamber 135.

A pressure delivery conduit 141 is affixed to the upper side of the crankcase assembly 94 and the cylinder head 91 and has inlet trumpet 142 that communicates with the pressure chamber 135. The discharge portion of this conduit, indicated by the reference numeral 143 communicates with a throttle body assembly 144 in which a butterfly-type or other suitable throttle control valve is provided. This throttle body 144 communicates with the cylinder head intake passage 103 so as to deliver the compressed charge to the combustion chamber 92 when the intake valve 105 is opened.

It should be noted that the throttle piston 123 of the carburetor 122 is disposed at a substantial distance from the actual combustion chamber 92. As a result of this, there may be slow response time when change and engine speed is demanded by the operator. Therefore, the throttle body 144 is provided which will ensure that the air flow is changed quickly and promptly in response to operator demand. In addition, the throttle body 144 ensures that too high a pressure will not be present in the cylinder head intake passage 103 under low speed low load conditions.

Thus, the throttle valve 123, which is actuated by a wire actuator 145 and the throttle valve 144 which is operated also by a wire actuator or suitable control are controlled by a common throttle control, indicated generally by the reference numeral 146. This throttle control 146 may either be a mechanical device or an electronic device. Basically, the throttle control 146 operates so as to open the sliding piston throttle valve 123 and the flow control throttle valve 144 at approximately the same rate and in the same direction.

That is, when the operator calls for increased speed and/or power, the throttle valves 123 and 144 are open progressively and in the same direction. In a like manner, when a speed decrease is called for, both throttle valves 123 and 144 will be moved in the same direction for effecting their simultaneous closing. Although the opening and closing of the throttle valves 123 and 144 may occur simultaneously and in the same amounts, it is also possible so as to provide some lost motion in the respective controls so that their movement is not totally simultaneous. However, in a preferred form of the invention, the throttle valves 123 and 144 are moved at the same time and in the same rate.

Because of the fact that the air flow may be relatively low at low speeds and low loads, there will nevertheless be a high pressure in the pressure chamber 135 and the conduit 143. A further arrangement is provided for minimizing these pressures under low speed, low load conditions. This system includes a bypass passage 147 which interconnects the intake chamber 129 with the pressure chamber 135, or more accurately the pressure chamber 135 with the intake chamber 129. A flow control valve 148 is provided in this conduit and preferably at the juncture of the conduit 147 with the pressure chamber 135.

In one preferred form of the invention, the control valve 148 is coupled to the throttle control mechanism 146 so that when the throttle valve 123 is moved towards its closed position, the control valve 148 will be moved toward an opened position. This will tend to bypass pressurized air back to the induction side of the crankcase chamber 98 and will ensure against the presence of high pressures in the intake side which are not necessary or even desirable. However, as the engine speed and load is increased due to an opening of the throttle valve 123, the control valve 148 will be closed and there will be immediately available a source of high pressure air so as to improve engine performance. Alternatively to such a mechanical interconnection between the throttle valves 123, 144 and 148, there may be provided an electronic control for all of the throttles.

Figure 3:
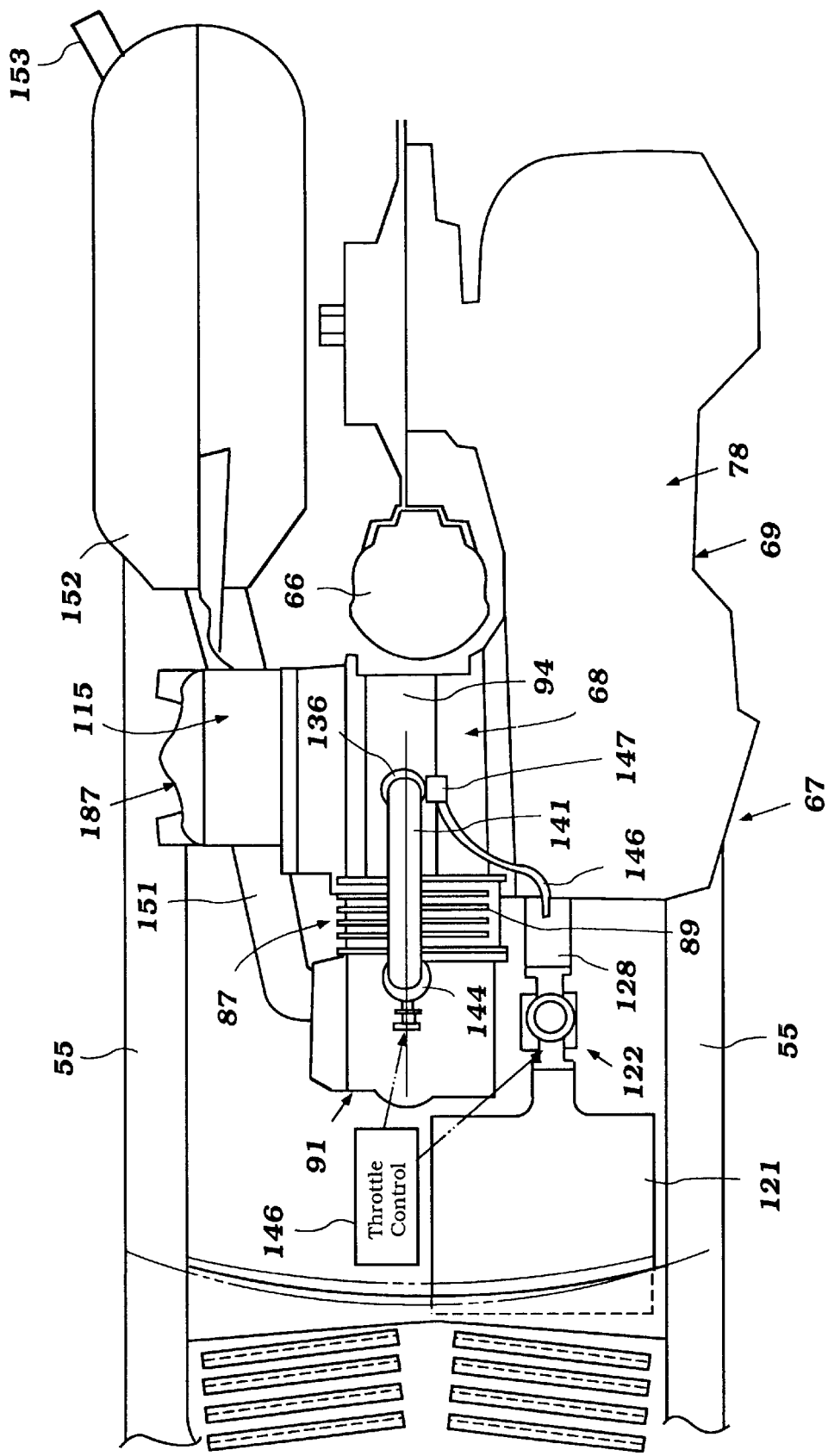
FIG. 3 is a top plan view of the structure shown in FIG. 2, however, certain additional components are shown in solid lines in this figure.

The exhaust system for exhausting the discharge gasses from the engine and specifically from the cylinder head exhaust passage 115 will now be described by primary reference to FIGS. 2–4. It should be noted that an exhaust manifold or collector 149 is affixed to the underside of the cylinder head 91 in communication with the cylinder head exhaust passage 115. The exhaust gases are delivered downwardly and then transversely across to an exhaust pipe 151 which extends rearwardly to an exhaust silencer 152. The exhaust silencer 152 has a tailpipe 153 from which the exhaust gases are discharged to the atmosphere.

It has been noted previously that the power unit 67 is mounted so that it pivots about the pivot pin 74 and 76. Since certain of the components such as the inlet device 121 and silencer 152 are mounted in generally fixed relation relative to the frame assembly of the motorcycle, the air inlet conduit 128 and exhaust pipe 151 may be formed with flexible sections so as to accommodate the relative movement without interfering with the flow of the intake and exhaust gases.

The lubricating system for the engine 68 will now be described by principal reference to FIGS. 2 and 4–6. This lubricating system is as disclosed in the co-pending application entitled, "Lubrication Device For Crank-Chamber Supercharged Engine", Ser. No. 08/563,971, Filed Nov. 29, 1995, in the name of one of the inventors hereof, Jun Taue, and assigned to the assignee hereof. The disclosure of this application is incorporated herein by reference but the system will also be described herein. Where those skilled in the art require more details of the lubrication system than disclosed herein, they may refer to that application.

Referring first to the bearing arrangement for the crankshaft 97, it will be seen that the crankshaft is provided with portions 154 and 155 that are disposed on opposite sides of the throw 102 and are joined thereto by respective cheeks 156 and 157. These crankshaft portions 154 and 155 are journaled by means of bearings 158 and 159 that are mounted in the crankcase assembly 94. Oil seals 161 and 162 are disposed outwardly of the bearings 158.

In addition, the connecting rod 133 cooperates with antifriction bearings 163 which are interposed between the connecting rod and the throw 102. The lubricating system is comprised of a pair of systems, one of the two-stroke type and one of the four-stroke type. Referring first to the four-stroke type lubricating system, this system appears best in FIGS. 4–6 and includes a supply tank 164 which contains four-stroke type lubricant and which is filled through a fill cap 165. This tank 164 supplies lubricant to a pump 166 through a conduit 167. The pump 166 then delivers a lubricant to a supply conduit 168 which communicates with the cylinder head as shown in FIG. 4 so as to deliver lubricant to the valve train contained therein.

This lubricant then drains through a chain case 169 formed at the lower end of the engine and which drains back to the area adjacent the crankshaft portion 154 for return through a return conduit 171 back to the four-cycle tank 164. The inclination of the cylinder block along the axis L-1 assists in this drainage. In addition to lubricating the valve train, this lubricant also lubricates the sprockets 111 and 113 and also lubricates timing chain 112.

The two-cycle lubricating system lubricates the piston sliding surfaces of the piston 93, the bearing surfaces for the connecting rod 102 and the main bearings 158 and 159 for the crankshaft as well as the big end rod bearing 163. This system is shown best in FIGS. 4 and 5 and includes a two-cycle lubricant supply tank, indicated generally by the reference numeral 172 that can be replenished through a fill cap 173.

A conduit 174 extends from this supply tank 172 to a metering type pump 175. The pump 175 delivers lubricant through a first conduit 176 to a pair of feeder supplies 177. The pump 175 is an electromagnetic type automatic lubricating pump having a solenoid with an armature mounted on the push rod of a plunger. This provides high pressure and improves the delivery against the pressure caused by the crankcase supercharging.

Lubricant is delivered through the cylinder block to recesses 178 and 179 formed in the piston 93 below its lowermost ring groove 181. This lubricant is collected and lubricates the sliding surfaces of the piston and the cylinder bore. In addition, the connecting rod small end 102 is formed with a pair of recesses 182 that communicate with the connecting rods small and bearing 101 for its lubrication.

The pump 175 also delivers lubricant to the crankshaft through a conduit 183. This conduit 183 communicates with a passage 184 in the crankcase assembly 194 and supplies lubricant to the main bearing 159. The crankshaft throw 102 is cross-drilled at 185 so as to deliver lubricant to the connecting rod bearing 163 and the remaining main bearing 158. This lubricant can then drain back to the air supply chamber 129 for return to the tank 172 through a return conduit 186. Again the inclination of the engine 68 assists in this dranage.

Because of the fact that the pressure side for delivery of the intake charge is on the upper side of the engine, the lubricant return by gravity to the air inlet side 129 will be free of the high pressure from the compressor and thus, will assist in the return of the lubricant to the tank 172.

As has been noted, this embodiment provides air cooling for the engine 67. This air cooling system is illustrated best in FIGS. 2 and 3 although the cooling fan, indicated generally by the reference numeral 187, also appears in FIG. 6. This cooling fan 187 is formed integrally with the flywheel magneto assembly 115 and operates to draw cooling air through vent openings 188 formed in the underbody and vent openings 189 formed in the body cover 61. These openings 188 and 189 are disposed so that the will receive ram air flow in addition to the air that is pumped by the fan 187.

This cooling air will flow over the cylinder block cooling fins 89 and corresponding fins (not shown) formed on the cylinder head 91 for cooling the engine. It should be noted that the air inlet device 121 is positioned in close proximity to these air inlet openings 188 and 189 and this will help to assist the supply of copious amounts of atmospheric air at a low temperature to the induction system for the engine.

The layout of the engine also is such that the pressure delivery port 135 is disposed on the same side of the engine as the cylinder head intake passage 103 and hence, the length of the pressurized inlet pipe 141 may be kept quite short and this improves induction efficiency.

Furthermore, the low positioning of the exhaust system also ensures good weight distribution and further the air cooling flow across the exhaust system will improve exhaust efficiency.

The final drive for the wheel 66 will now be described by reference to FIG. 7. It will be seen that the transmission outer casing 78 contains a driving pulley 191 of a continuously variable transmission that includes a drive belt 192. This drive belt 192 is engaged with a variable sheave 193 of the driven part of the CVT which, in turn, is coupled by a centrifugal clutch mechanism 194 to a CVT output shaft 195. The centrifugal clutch 195 includes an outer plate 196 which encloses an inner housing 197 and the centrifugal weights 198.

The CVT output shaft 195 has connected to it a driving gear 199 of a first gear reduction stage 201 which drives a larger idler gear 202. This gear is integral with a further gear 203 of a second reduction stage which engages a larger diameter gear 204 that is fixed to an axle shaft 205 of the rear wheel 66 for driving it. In this embodiment, the wheel 66 rotates in the same direction as the engine crankshaft 97.

Another feature of the engine 68 will now be described by reference to FIG. 4. This is the feature which has been previously mentioned wherein the pressure of the air over the fuel bowl 126 is adjusted so as to correspond to super charger pressure or another pressure depending upon the engine running conditions. This control system is indicated generally by the reference numeral 206 and is shown in the upper left-hand side of FIG. 4. There is provided a pressure conduit 207 that communicates with the fuel bowl 126 above the level of fuel therein. This conduit is served by a conduit 208 which extends to the pressure conduit 141 that communicates the pressure chamber 135 with the throttle body 144. This passage 208 branches into two sections 209 and 211. In the conduit 209, there is provided a control valve 212 which is operated by an ECU 213 that reads both engine speed and throttle valve position of the throttle valve 123.

This section communicates with the conduit 208 through a first passage in which a restricted orifice 213 is provided. A more restricted orifice 214 is placed in the conduit 211. The CPU 213 operates in accordance with a control strategy so that when the engine is idling or operating at a relatively low speed, the valve 212 is closed. Under this condition, the more restricted orifice 214 will reduce the pressure that is exerted over the fuel in the fuel bowl 126 so as to place it closer to atmospheric pressure.

However, when the engine speed and load increase, then the valve 212 is opened and the less restricted orifice 213 permits a higher pressure more equivalent to that present in the cylinder head intake passage 103 will be exerted over the fuel in the fuel bowl 126. Therefore, the metering circuits will operate in response to the actual pressure that is existent in the intake passage of the cylinder head.

Next will be described a number of different embodiments for engine placement in the scooter 51 and various types of cooling arrangements. In describing these embodiments, the basic internal components of the engine 68 are as previously described. However, their orientation has been changed. For this reason, when components of these further embodiments are the same as those already described, they are identified by the same reference numerals and will be described again only insofar as is necessary to understand the construction and operation of these alternative embodiments.

Figure 8:
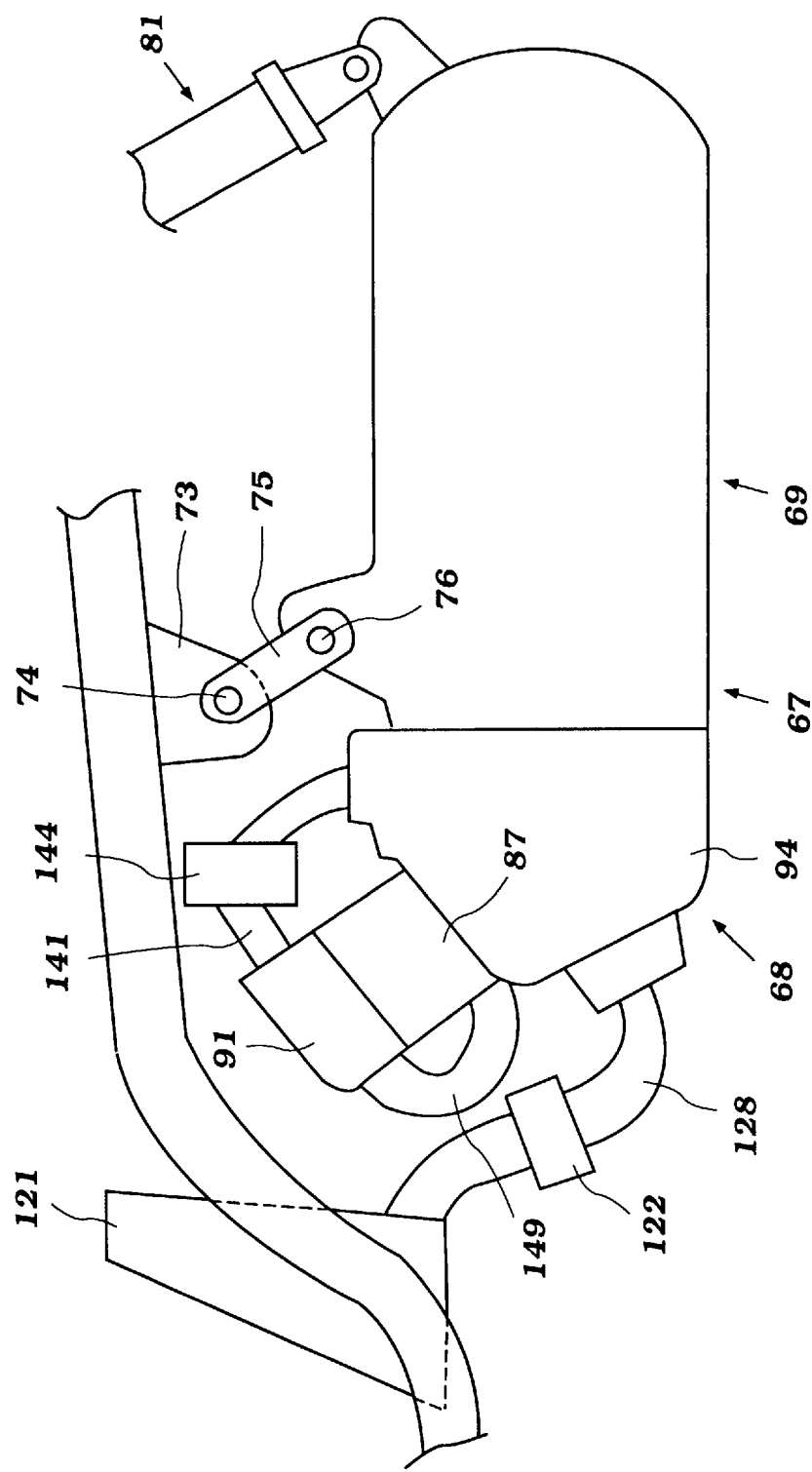
FIG. 8 is a side elevational view, in part similar to FIG. 2, and shows another embodiment of the invention.

FIG. 8 shows another embodiment which differs from the embodiment previously described in the angular orientation of the cylinder block 87 relative to the crankcase assembly 94. In addition, the air inlet device is relocated in this embodiment. Since these are the only differences and as noted, all components of this embodiment have been identified by the same reference numerals as were utilized to identify the same components of the previously described embodiments.

In this embodiment, the air inlet device 121 is disposed at a higher location in the frame and may be disposed immediately behind the body cover 61 in proximity to the air vents 189 which do not appear in this figure. The air inlet device 121 serves the carburetor 122 which is positioned at a lower location and which is of the downdraft type so as to supply the air charge to the crankcase chamber in the manner previously described.

In this embodiment, the cylinder block 87 is inclined at a more steep angle to the horizontal and is nearly vertical so that the cylinder head 91 is positioned adjacent the air inlet device 121 into the rear of it. The control valve 144 is positioned to the rear of the cylinder head 91 in this embodiment because of the displaced orientation of the components.

Figure 9:
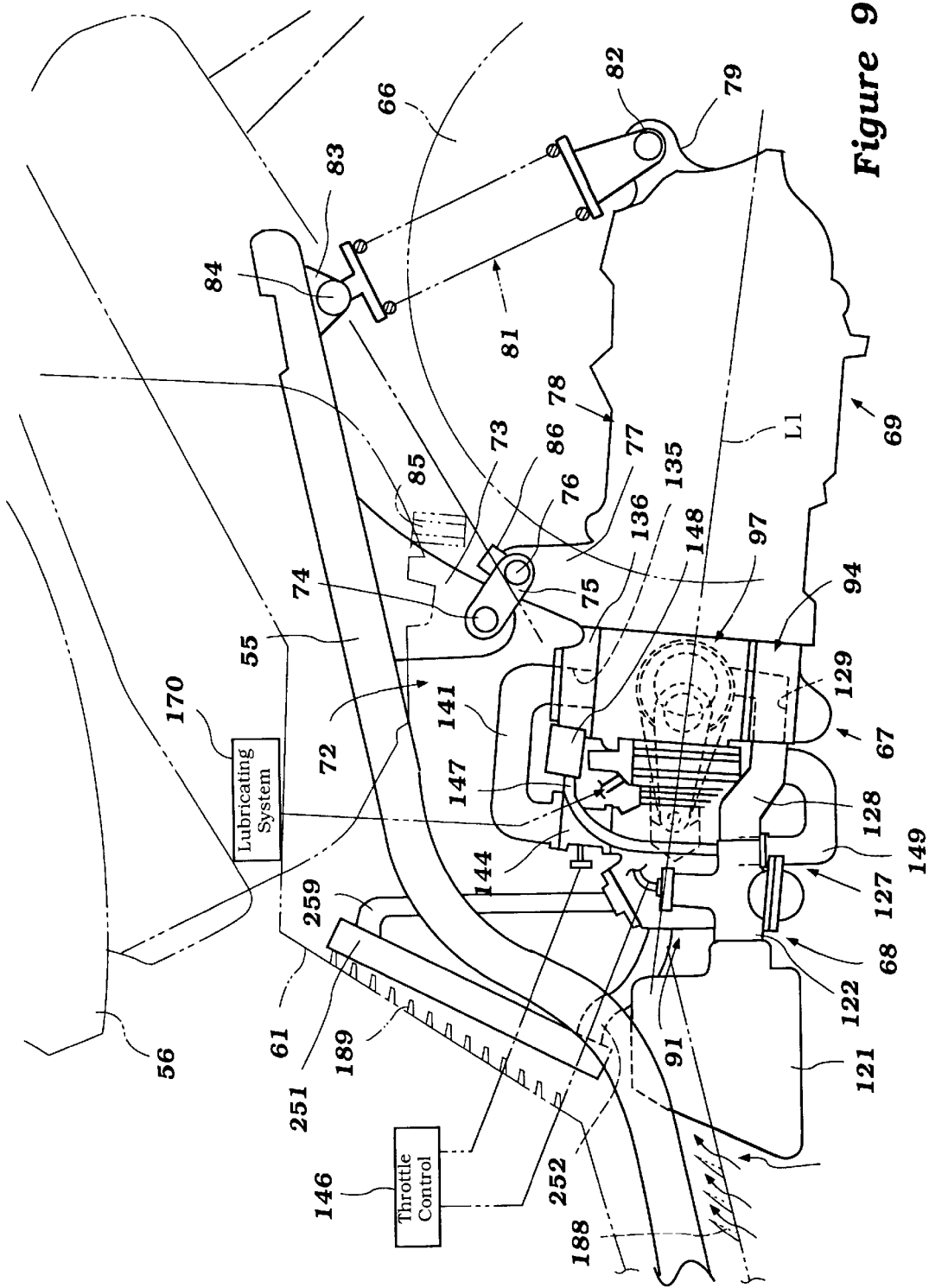
FIG. 9 is a partial side elevational view, in part similar to FIGS. 2 and 8, and shows a third embodiment of the invention.
Figure 10:
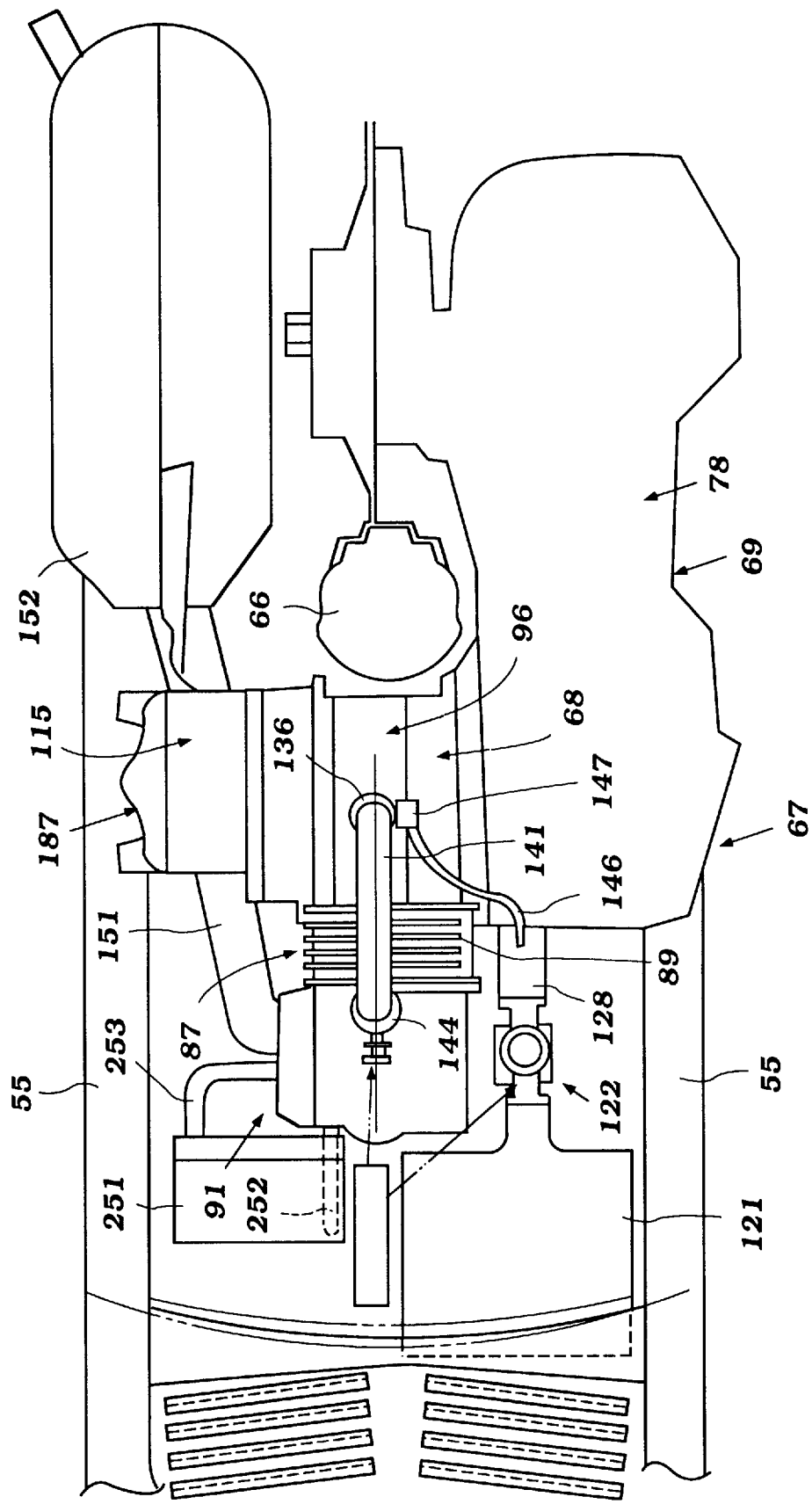
FIG. 10 is a top plan view, in part similar to FIG. 3, of the third embodiment.

FIGS. 9 and 10 show another embodiment of the invention which is basically the same as the embodiment of FIGS. 1–7 however, in this embodiment the engine 67 is partially water cooled and partially air cooled. For the reasons previously noted, therefore, components of this embodiment which are the same as that previously described have been identified by the same reference numerals and will be described again only insofar as is necessary to understand the construction and operation of this embodiment.

In this embodiment, the cylinder block 87 is again water cooled and therefore the cylinder block is provided with the cooling fins 89, however, the cylinder head 91 is provided with a cooling jacket through which liquid coolant is circulated by a water pump driven from the engine in a suitable manner. This coolant is then circulated through a heat exchanger, indicated generally by the reference numeral 251 that is disposed in the body portion 161 behind the air inlet ducts 89 so that the heat exchanger 251 can exchange heat from the liquid coolant through the circulated water.

Conduits 252 and 253 deliver water from the heat exchanger 251 to the cooling jacket of the cylinder head 91 and return it to the heat exchanger 251. With this arrangement and as seen in FIG. 10, the air cleaner 121 can be disposed transversely on one side of the engine and thus will be spaced from the heat exchanger 251 so as to provide a continued supply of cool air to the engine without picking up heat from the cooling of the cylinder head 91.

Figure 11:
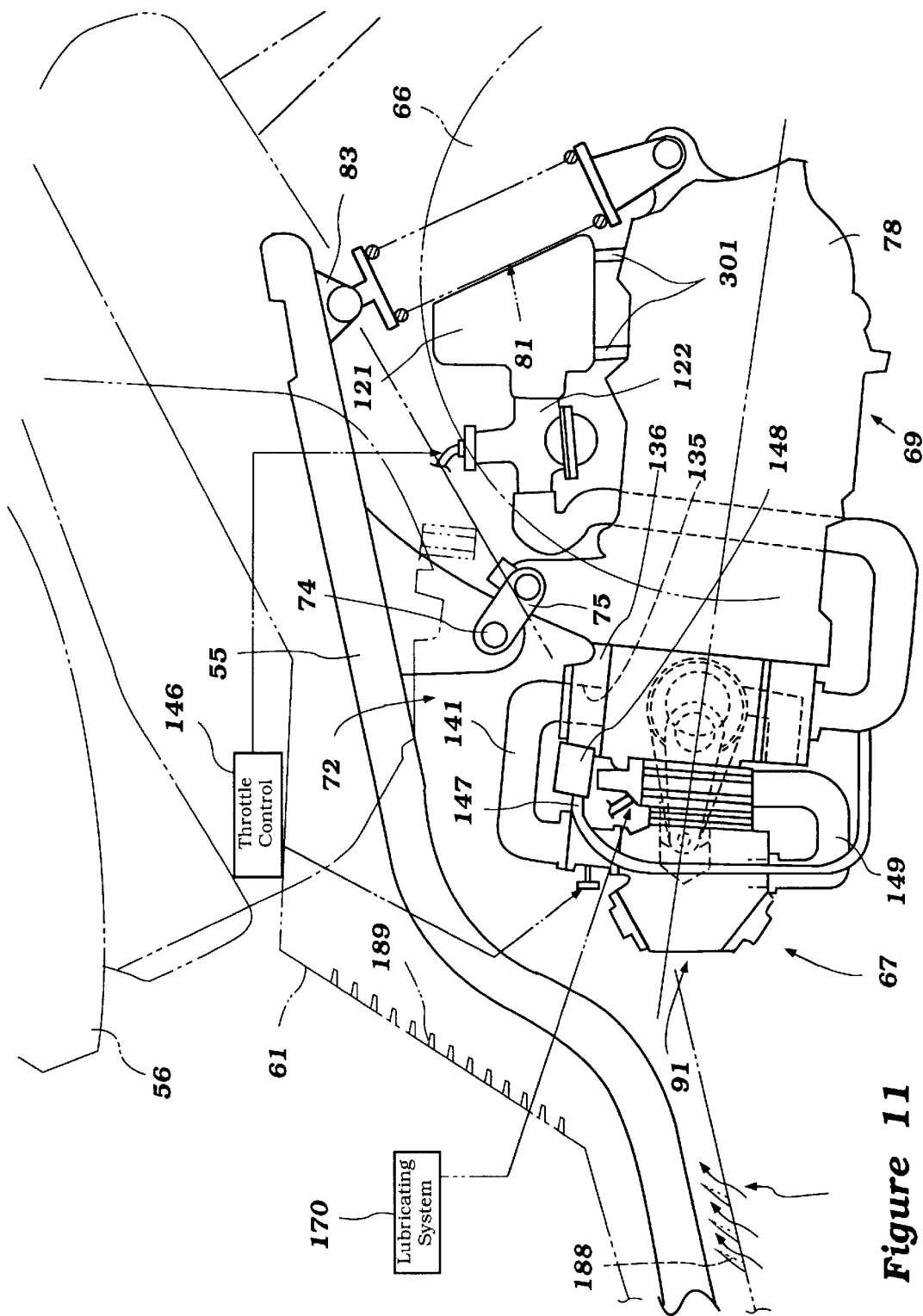
FIG. 11 is a side elevational view, in part similar to FIGS. 2, 8 and 9, and shows a fourth embodiment of the invention.
Figure 12:
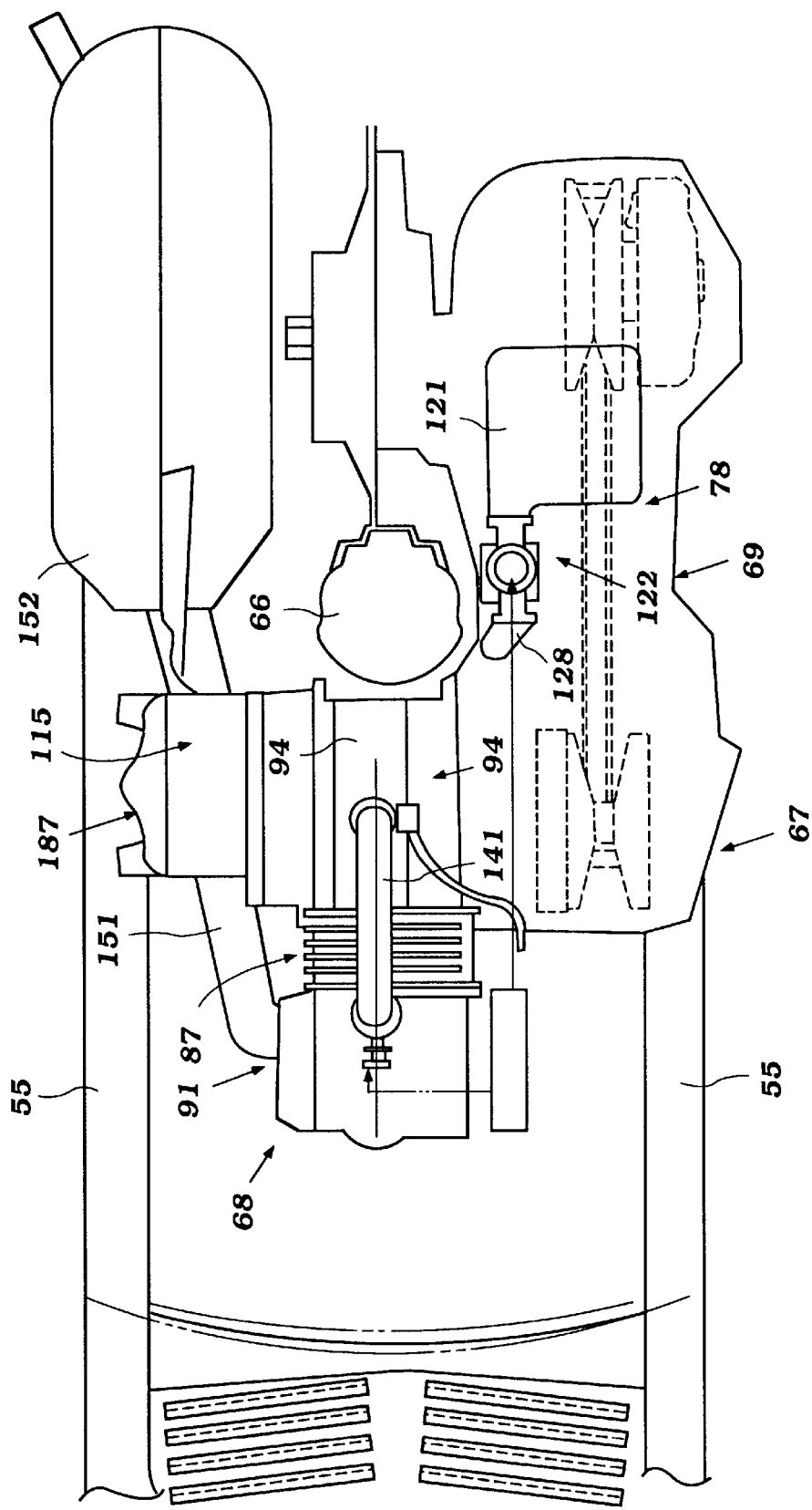
FIG. 12 is a top plan view, in part similar to FIGS. 3 and 10, of this fourth embodiment.

FIGS. 11 and 12 show another embodiment which is generally the same as the embodiment of FIGS. 1–6. In this embodiment, however, the carburetor and air inlet devices, again indicated by the reference numerals 122 and 121, respectively are disposed to the rear of the engine and above the transmission unit 69. By putting the air cleaner 121 in this position, it can be more readily serviced and can be mounted easily on the transmission casing 78 by means of mounting brackets 301. This eliminates the necessity for flexible connections in the induction system. Furthermore, this places the air inlet device in an area where it will receive cool air circulated by the fan 187. Because of this arrangement, the throttle control is also moved to the rear.

Figure 13:
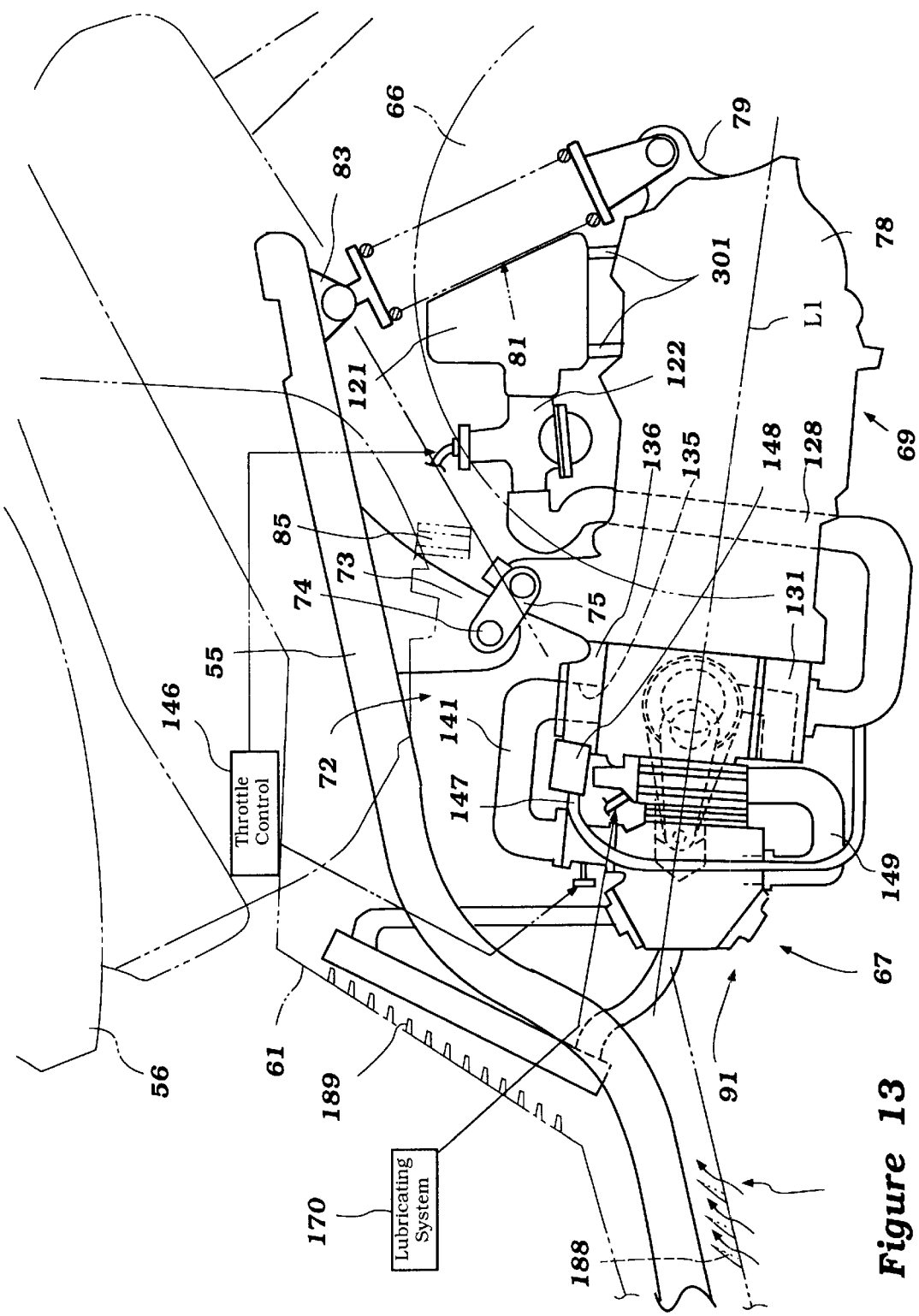
FIG. 13 is a side elevational view, in part similar to FIGS. 2, 8, 9 and 11, and shows a fifth embodiment of the invention.
Figure 14:
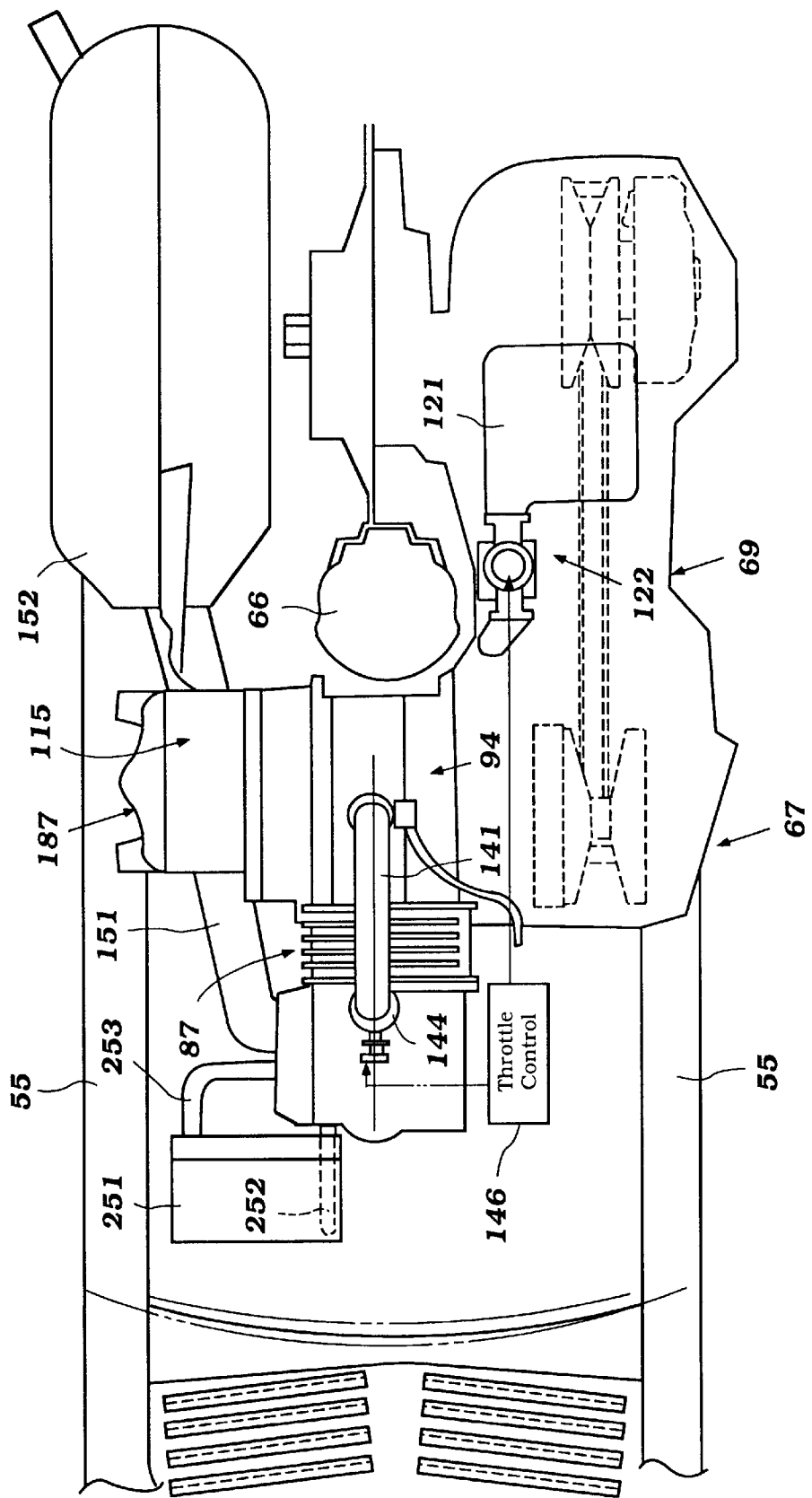
FIG. 14 is a top plan view, in part similar to FIGS. 3, 10 and 12, of this fifth embodiment.

FIGS. 13 and 14 show another embodiment which is generally the same as the embodiment of FIGS. 1–6. With this embodiment, however, the water cooled cylinder head 91 as employed in the embodiment of FIGS. 9 and 10 are utilized and the induction system of FIGS. 11 and 12 is employed with the rear mounted air inlet device 121. Again, this arrangement isolates the heat exchanger 251 from the air inlet device 121 and minimizes heat transfer problems.

Figure 15:
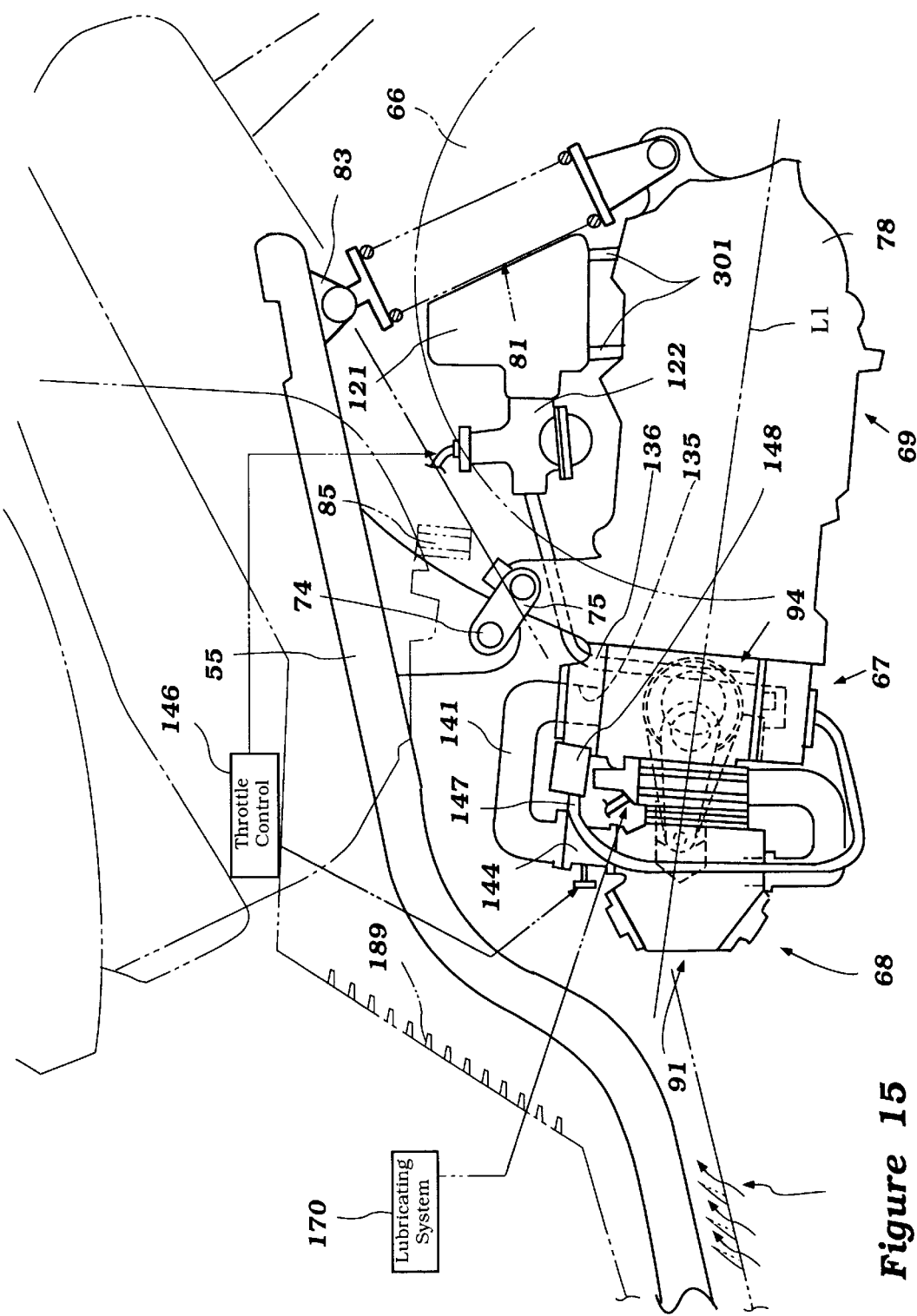
FIG. 15 is a partial side elevational view, in part similar to FIGS. 2, 8, 9, 11 and 13, and shows a sixth embodiment of the invention.
Figure 16:
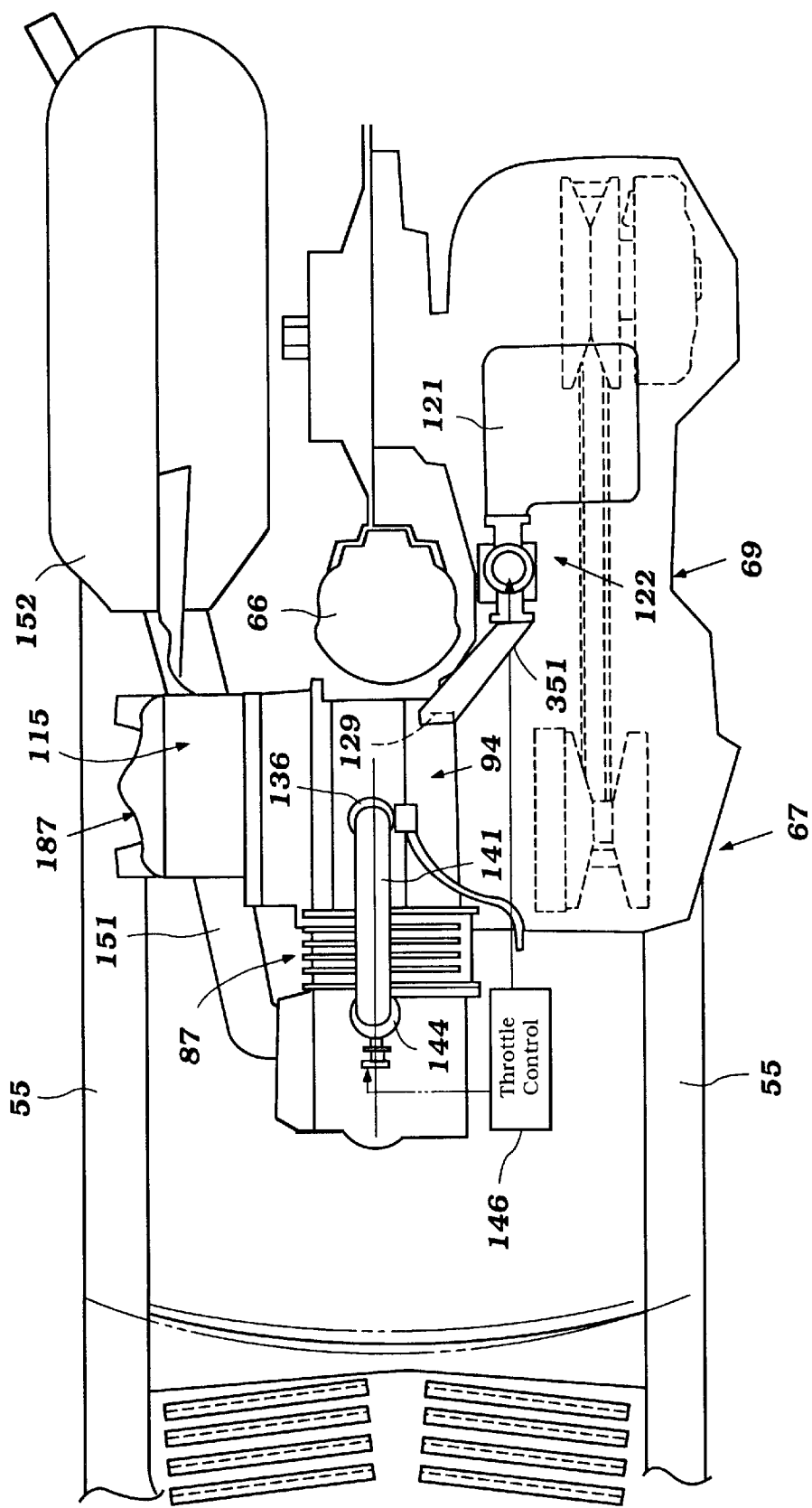
FIG. 16 is a top plan view of this embodiment and is, in part, similar to FIGS. 3, 10, 12 and 14.

FIGS. 15 and 16 show another embodiment of air cooled arrangement that is basically the same as the embodiment of FIGS. 11 and 12. In this embodiment, however, the shape of the intake passage extending from the carburetor 122 to the crankcase pressure inlet portion 129 is changed so that the intake passage, indicated by the reference numeral 351 has a generally rectangular configuration. This arrangement also permits the air cleaner 121 to be mounted on and move with the transmission assembly 69.

Figure 17:
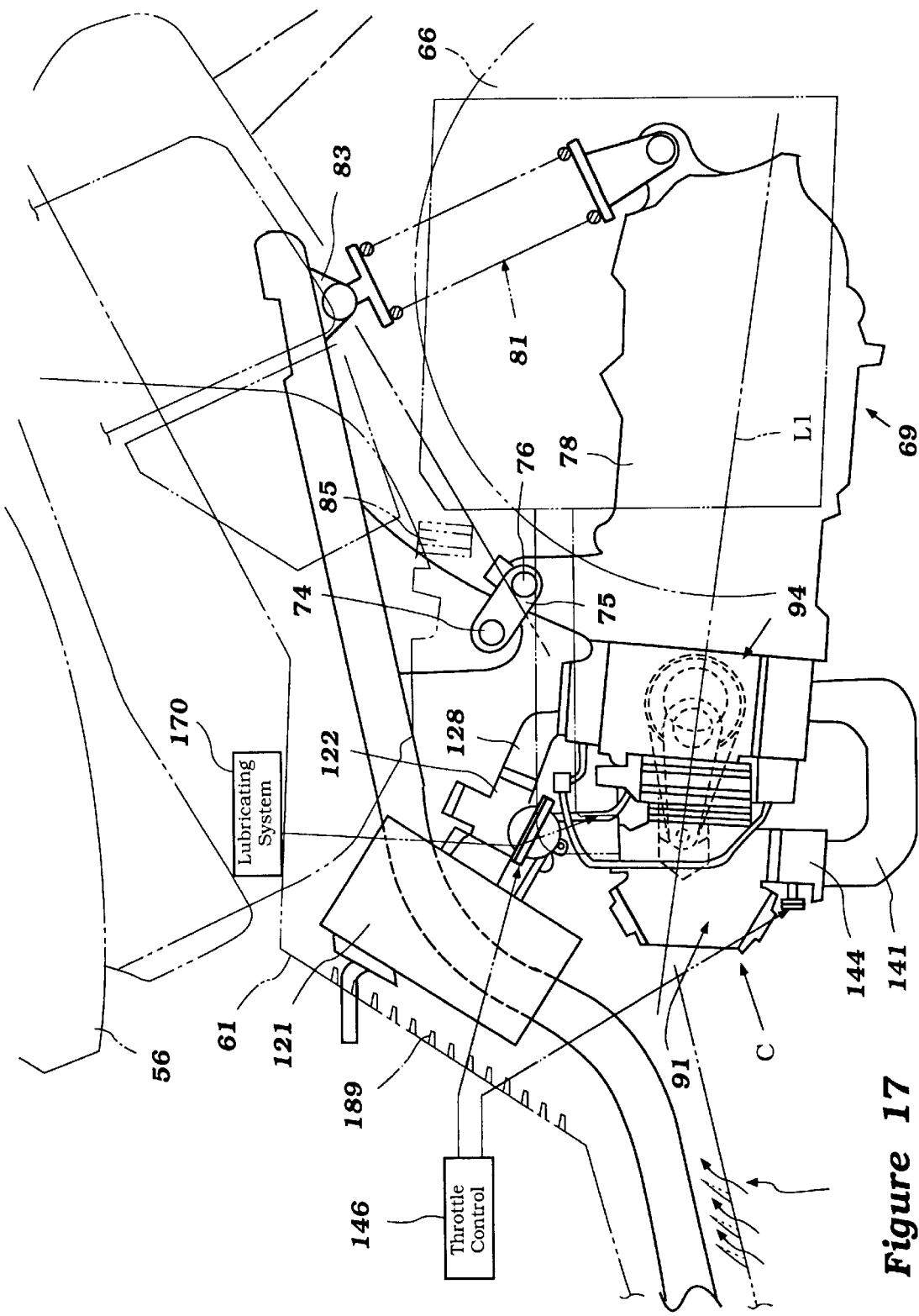
FIG. 17 is a side elevational view of a seventh embodiment of this invention, in part similar to FIGS. 2, 8, 9, 11, 13 and 15.
Figure 18:
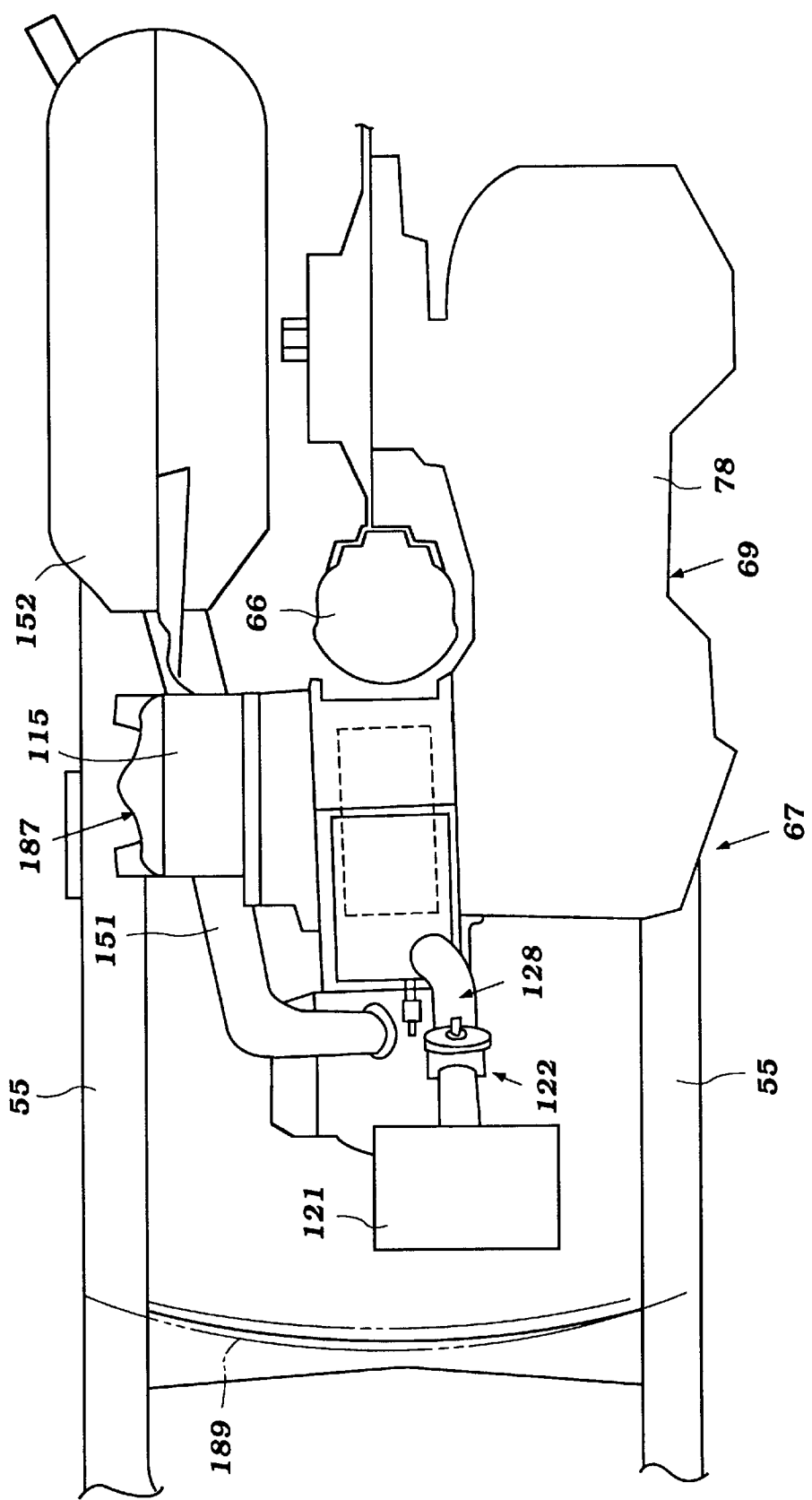
FIG. 18 is a partial top plan view of this seventh embodiment and is in part similar to FIGS. 3, 10, 12, 14 and 16.

FIGS. 17 and 18 show another embodiment of the invention which is generally similar to the embodiment of FIGS.

1–6. In this embodiment, however, the compressor atmospheric air inlet side is reversed from the previous embodiment as is the pressure discharge side. Thus, the air inlet device 121 carburetor 122 and atmospheric supply conduit 128 are provided on the top of the engine. This permits the air inlet device 121 to be located forwardly in proximity to the body air inlet openings 189.

The pressure conduit line 141 is disposed on the underside of the engine and thus, is in a position where it will receive large amounts of cooling air so as to provide a intercooling effect. In addition, the exhaust system in this embodiment is thus put on the top of the engine and thus, permits further latitude in the configuration of the exhaust system.

Figure 19:
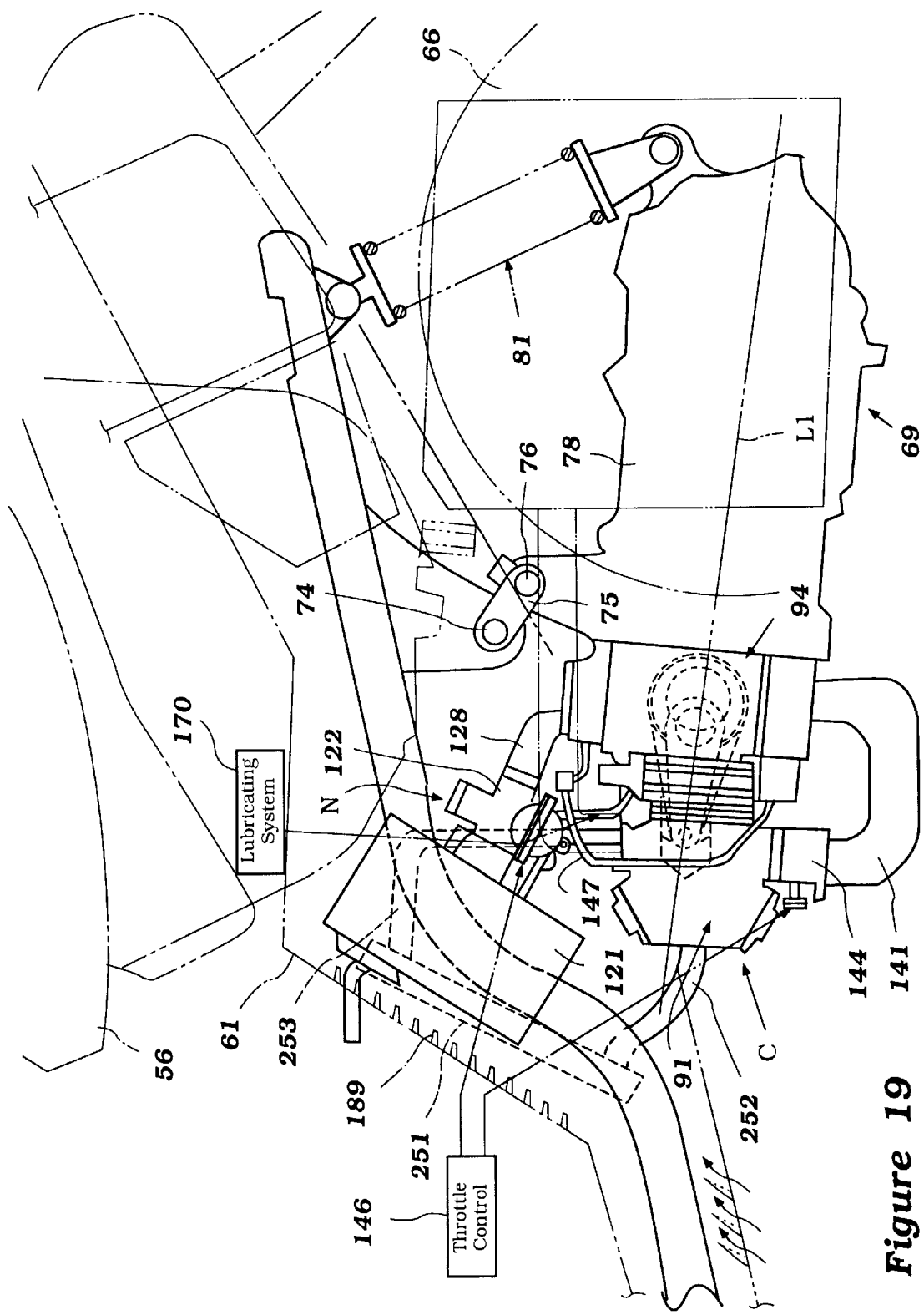
FIG. 19 is a partial side elevational view of an eighth embodiment of this invention and is in part similar to FIGS. 2, 8, 9, 11, 13, 15 and 17.
Figure 20:
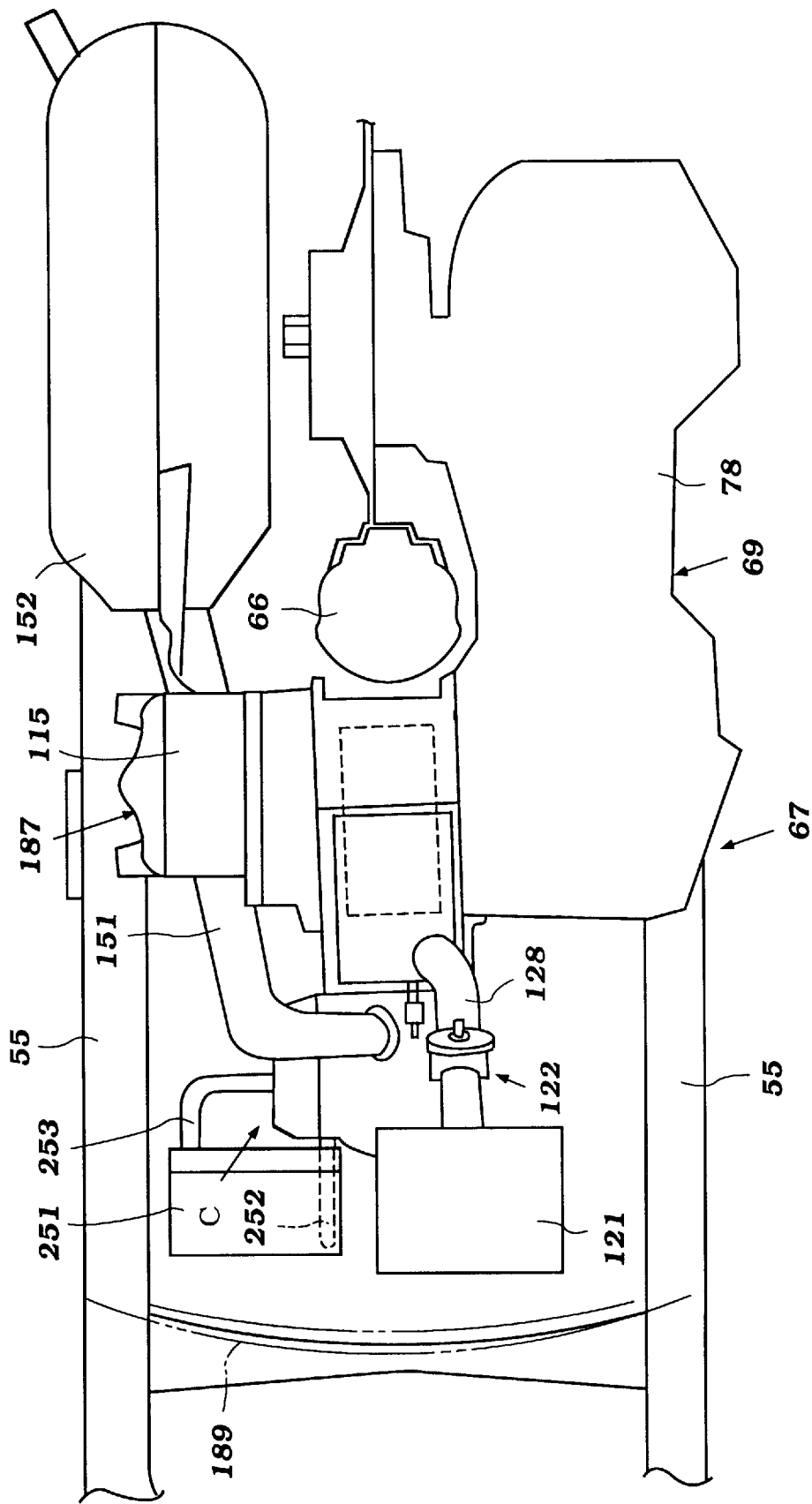
FIG. 20 is a partial top plan view of this eighth embodiment and is, in part, similar to FIGS. 3, 10, 12, 14, 16, 18 and 20.

FIGS. 19 and 20 show another embodiment which utilizes the layout of the atmospheric and pressure sides in the same location as the embodiment of FIGS. 17 and 18. This embodiment also incorporates a liquid cooling arrangement for the cylinder head like the embodiment of FIGS. 9 and 10. For these reasons, the components which are the same have been identified by the same reference numerals and further description of them is not believed to be required. However, in this embodiment, the air inlet device 121 is positioned in side-by-side relationship to the heat exchanger 251 so as to minimize heat transfer therebetween.

Figure 21:
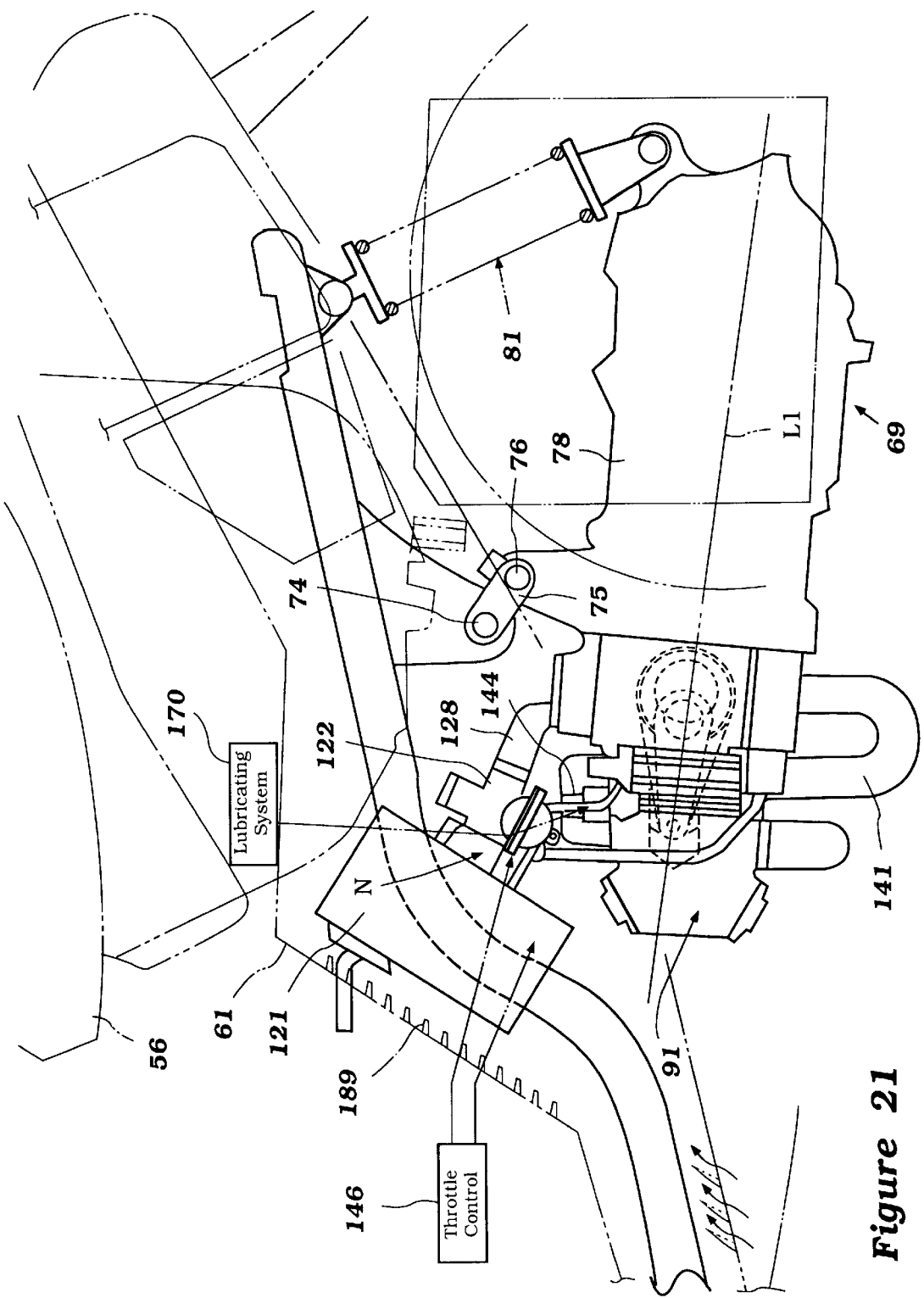
FIG. 21 is a partial side elevational view of a ninth embodiment of this invention and is, in part, similar to FIGS. 2, 8, 9, 11, 13, 15, 17 and 19.
Figure 22:
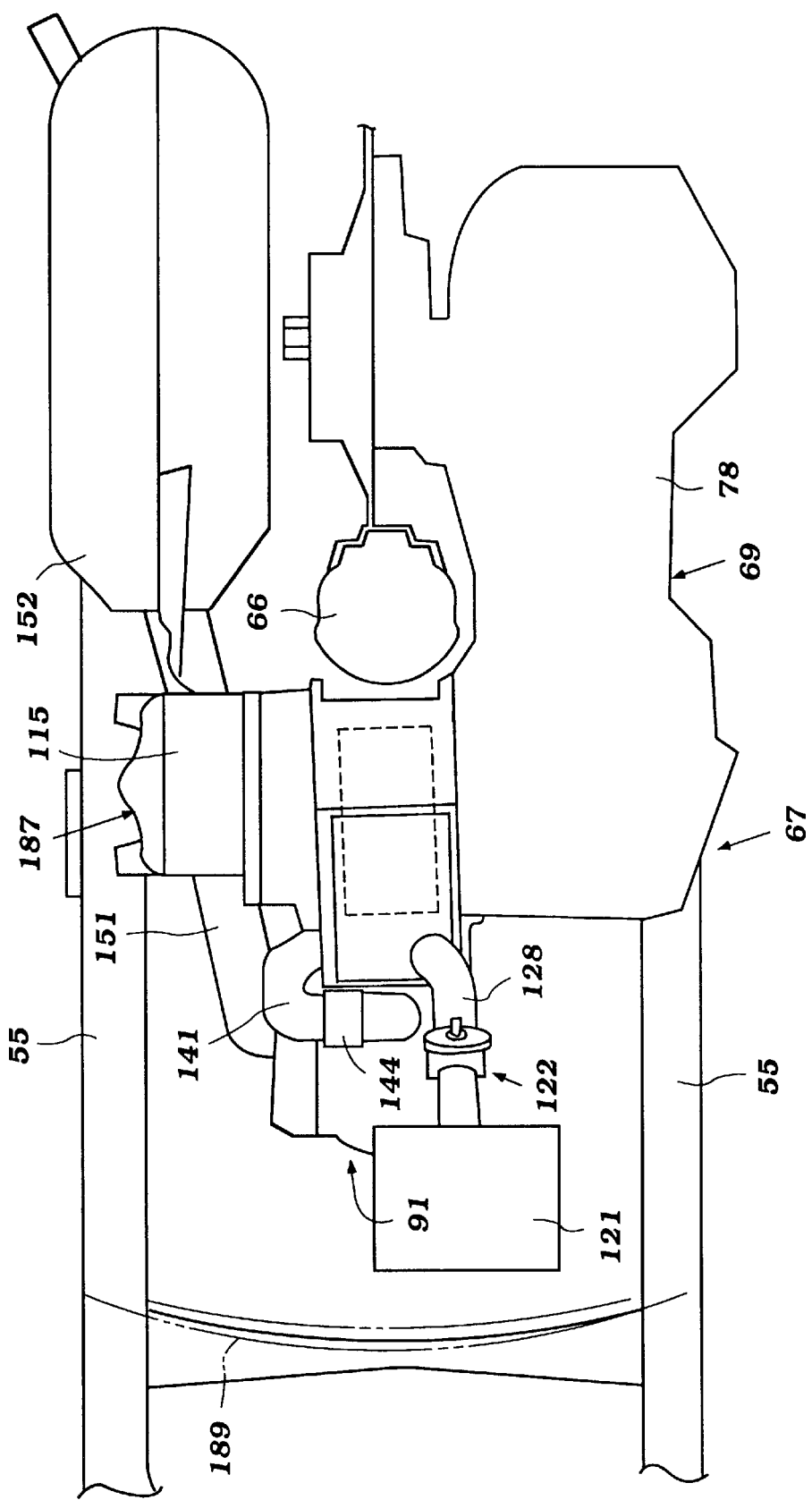
FIG. 22 is a partial top plan view of this ninth embodiment and is, in part, similar to FIGS. 3, 10, 12, 14, 16, 18 and 20.

FIGS. 21 and 22 show another embodiment which is basically the same as the embodiment FIGS. 17 and 18. However, with this embodiment, the cylinder head 91 is positioned as with the embodiment of FIGS. 1–6 so that the intake port is at the top of the engine and the exhaust port is at the bottom of the engine. Therefore, with this embodiment the pressure conduit 141 that extends from the pressure chamber at the lower end of the crankcase extends upwardly and enters the cylinder head its upper surface so that the control valve 144 is provided at the top of the engine. Aside from this, the embodiment is the same as those previously described and, for those reasons, the same reference numerals apply to like components of earlier embodiments are employed in these figures.

Figure 23:
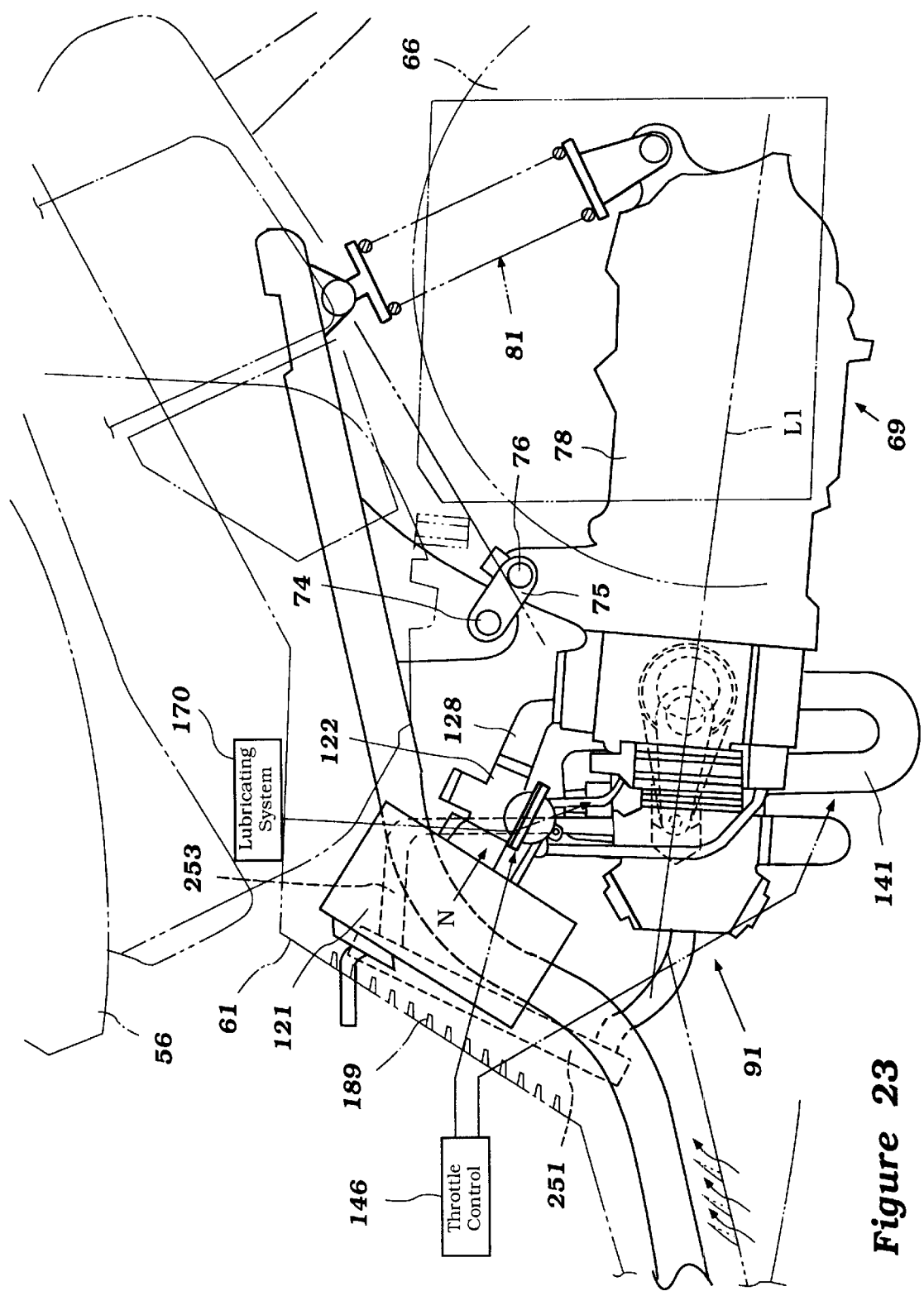
FIG. 23 is a partial side elevational view of tenth embodiment of this invention and is, in part, similar to FIGS. 2, 8, 9, 11, 13, 15, 17, 19 and 21.
Figure 24:
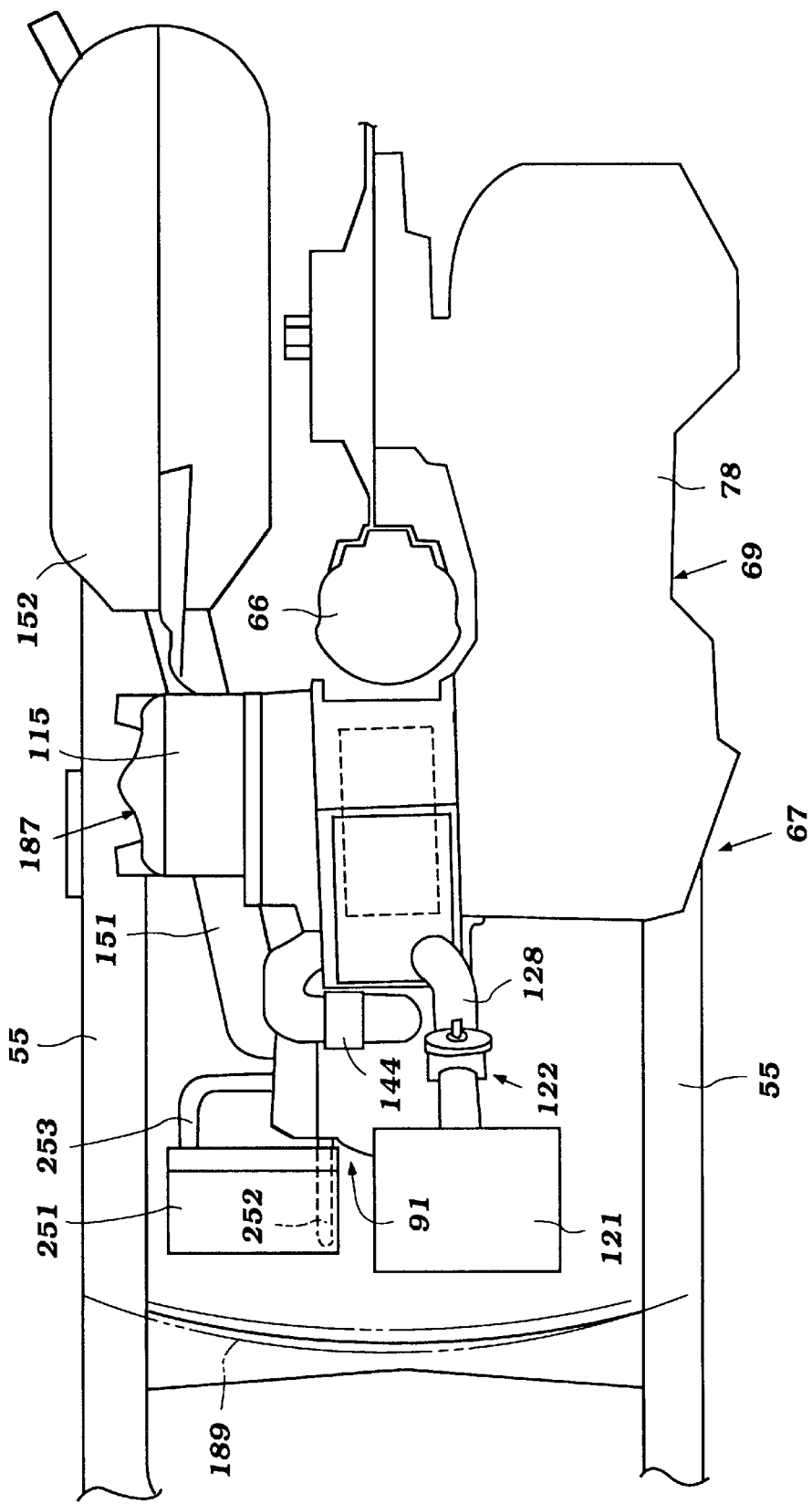
FIG. 24 is a partial top plan view of this tenth embodiment and is, in part, similar to FIGS. 3, 10, 12, 14, 16, 18, 20 and 22.

FIGS. 23 and 24 illustrate an embodiment like that of FIGS. 21 and 22 but utilizing the water cooled cylinder head of the embodiment FIGS. 19 and 20. For that reason, further description of this embodiment is not believed to be necessary to permit those skilled in the art to understand and practice the invention.

Figure 25:
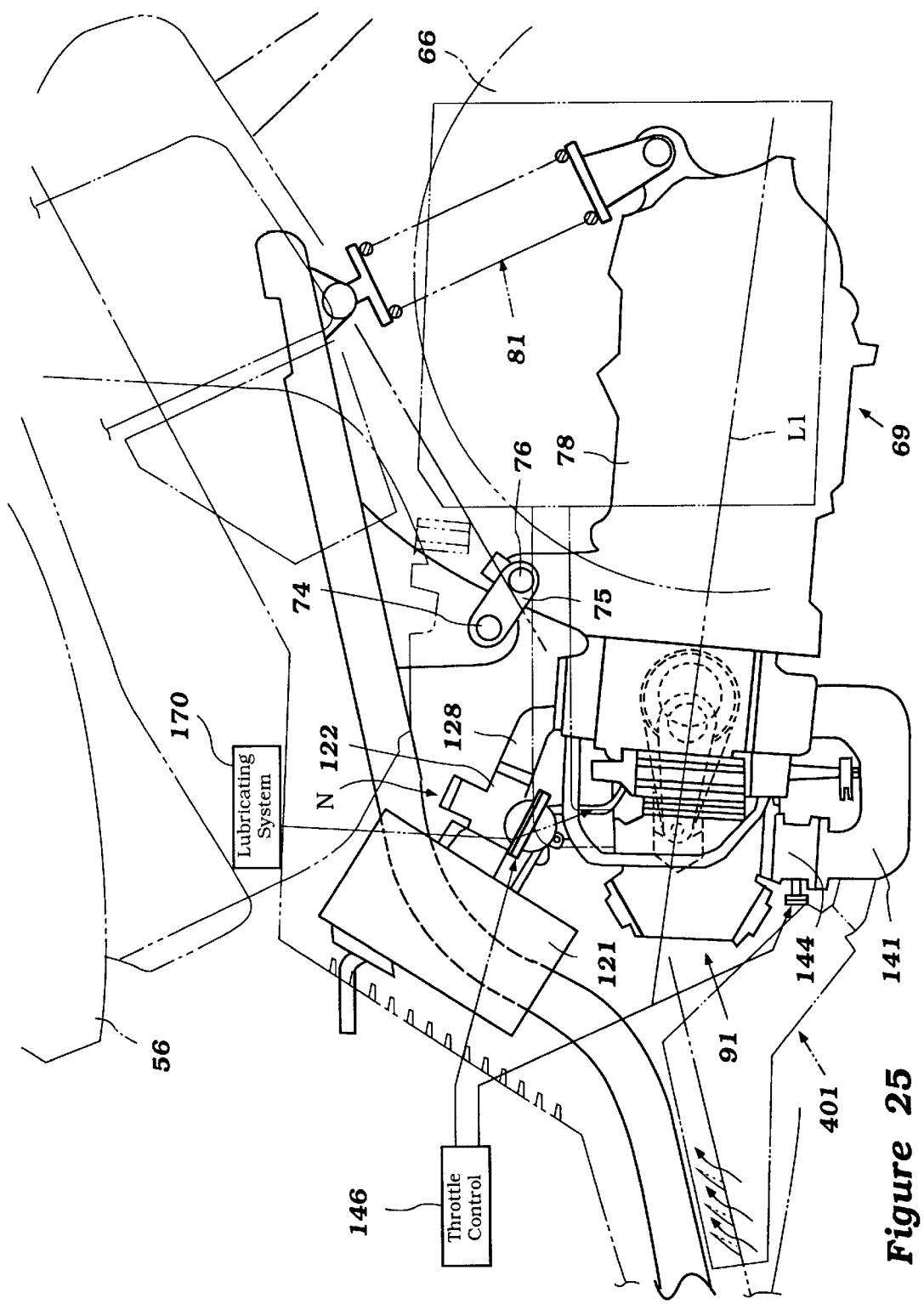
FIG. 25 is a partial side elevational view of an eleventh embodiment of this invention and is, in part, similar to FIGS. 2, 8, 9, 11, 13, 15, 17, 19, 21 and 23.
Figure 26:
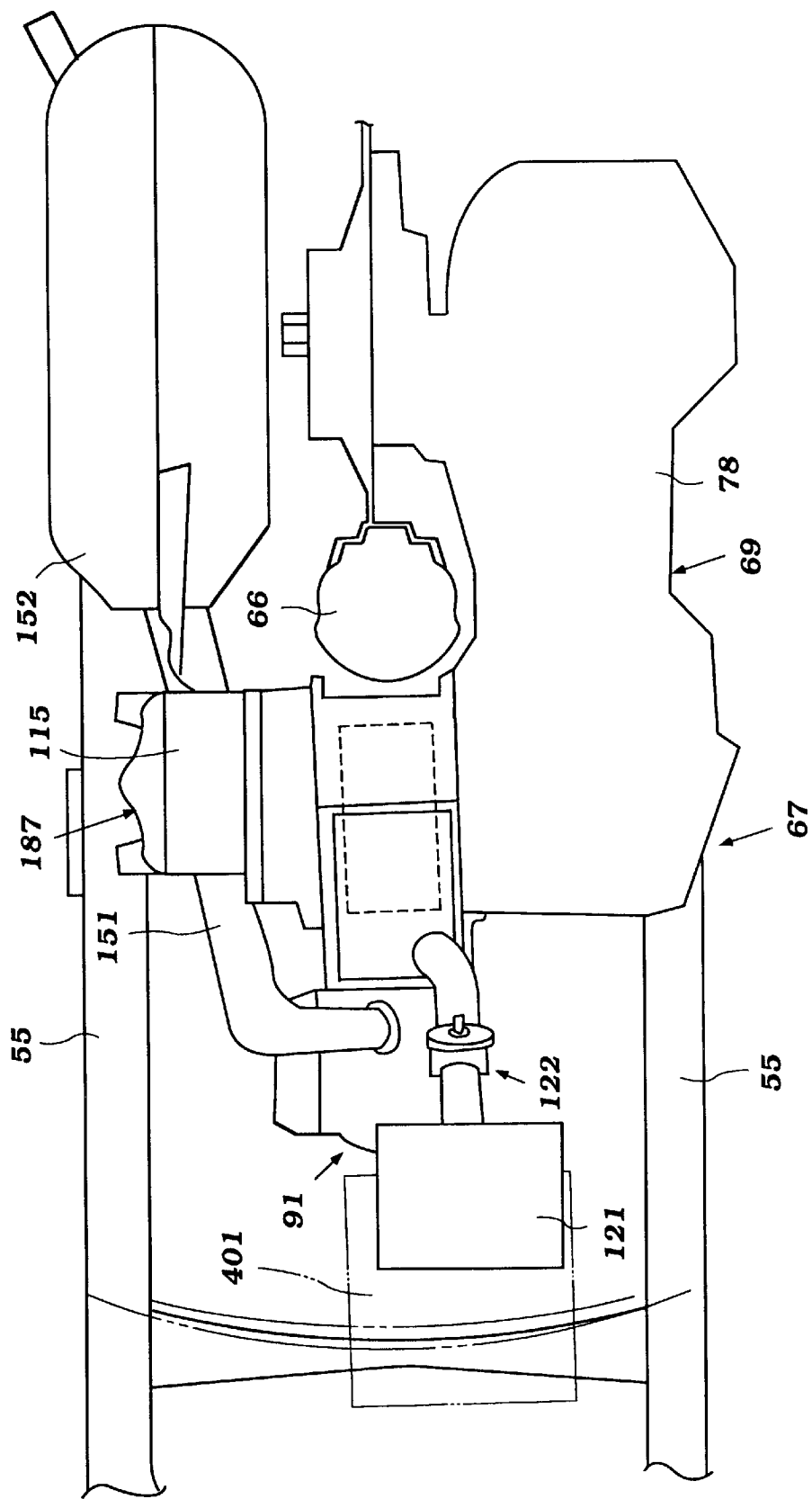
FIG. 26 is a partial top plan view of this eleventh embodiment and is, in part, similar to FIGS. 3, 10, 12, 14, 16, 18, 20, 22 and 24.

FIGS. 25 and 26 show another embodiment of an invention which is the same as the embodiment of FIGS. 23 and 24. In this embodiment, however, there is provided an additional supercharger plenum tank, indicated by the reference numeral 401 and shown in phantom which communicates with the pressure conduit 141 and provides a damping chamber so as to minimize pressure fluctuations in the pressure transmitted to the combustion chamber.

Figure 27:
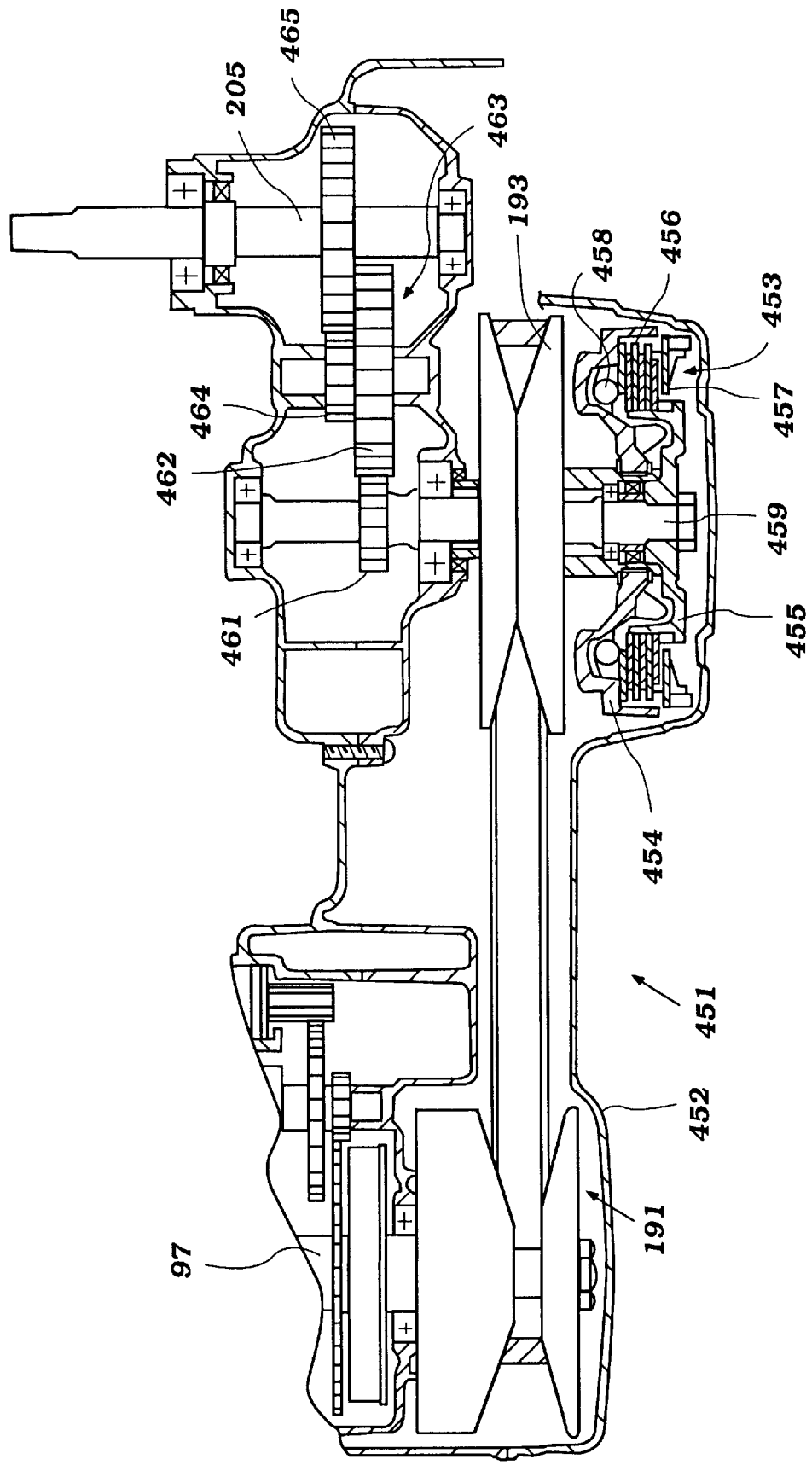
FIG. 27 is a cross-sectional view, in part similar to FIG. 7, and shows a further embodiment of rear wheel driving transmission.

Next will be described several alternative transmission arrangements that can be utilized to practice the invention in lieu of the type of transmission shown in FIG. 7. A first of these embodiments shown in FIG. 27 is identified by the reference numeral 451 and which includes a transmission case 452 in which the driving pulley 191 of a continuously variable transmission is provided which is coupled to the crankshaft 97. This drives a driven pulley of the variable sheave type 193 which is coupled to a centrifugal clutch, indicated generally by the reference numeral 453. The centrifugal clutch 453 is of the multiple plate-type having a driving plate 454 which drives a driven plate 455 through a plurality of clutch plates 456 and 457. Centrifugal balls 458 control the engagement pressure.

When engaged, the driven clutch plate 455 is coupled to a driveshaft 459 which extends through the sheave of the driven pulley 193 and drives a gear 461 of a first reduction unit. The gear 461 is enmeshed with a larger diameter gear 462 so as to provide a first speed reduction. This transmission is contained within a second transmission casing 463 which also includes a second gear reduction stage. This second gear reduction stage includes a gear 464 which is fixed for rotation with or formed integrally with the gear 462. The gear 464 is enmeshed with a larger diameter gear 465 that is fixed to the axle shaft 205. Like the embodiment of FIG. 7, this embodiment provides driving of the rear wheel in the same direction of rotation as the engine.

Figure 7:
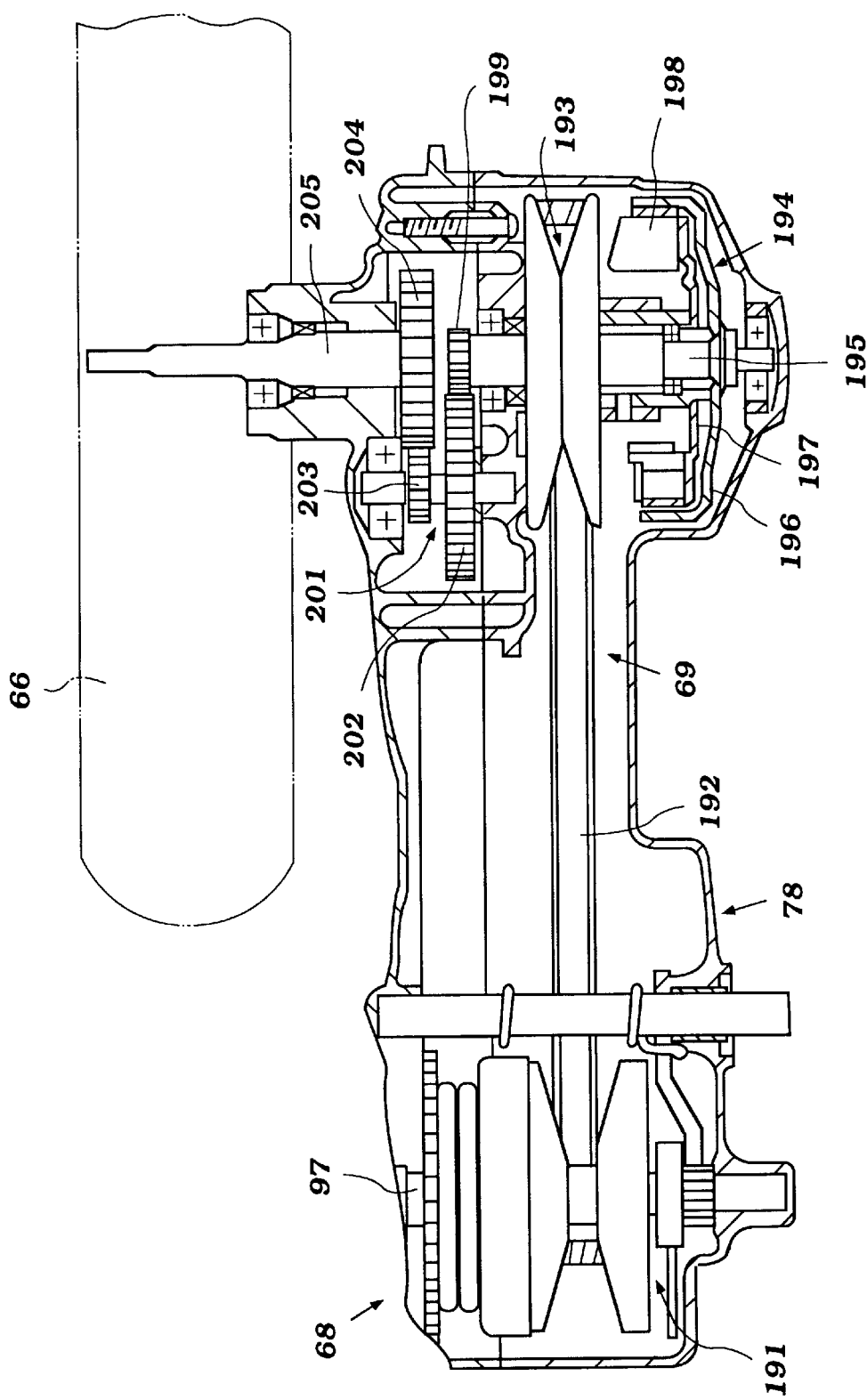
FIG. 7 is a cross-sectional view taken through the transmission for driving the rear wheel of the scooter from the engine.
Figure 28:
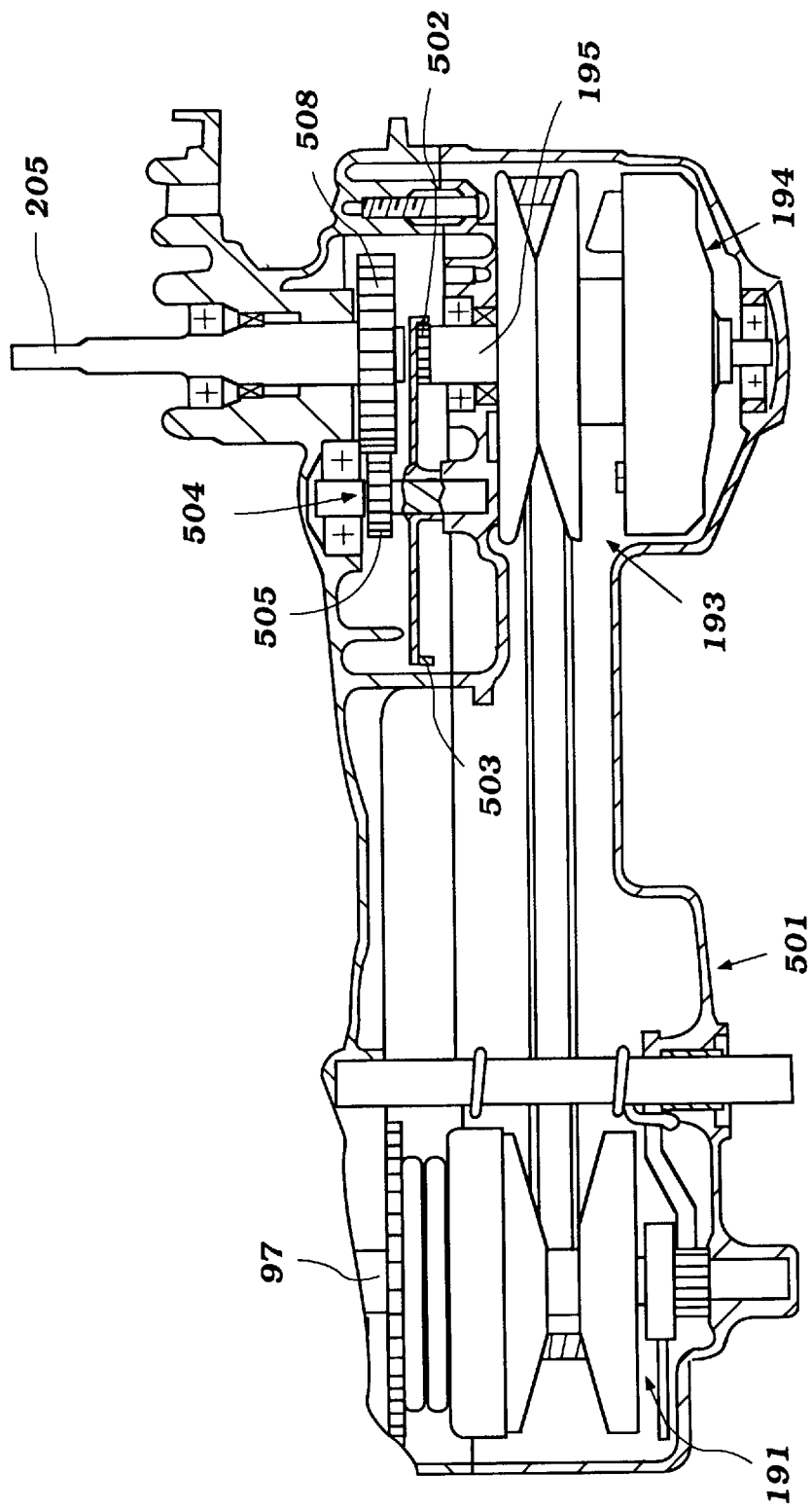
FIG. 28 is a cross-sectional view, in part similar to FIGS. 7 and 27, and shows another transmission embodiment.

FIG. 28 shows an embodiment which is like the embodiment of FIG. 7 but in which the driven wheel is driven in a direction contrary to the direction of rotation of the crankshaft 97. Since the basic transmission is the same as that of FIG. 7, components which are the same have been identified by the same reference numerals and will not be described again. However, the complete transmission assembly is indicated by the reference numeral 501 and includes the CVT transmission including the driving variable sheave 191 and driven variable sheave 193 and associated centrifugal clutch 194.

The clutch output shaft 195 is coupled to a pinion gear 502 that is enmeshed with an internal ring gear 503 fixed to an intermediate shaft 504. The intermediate shaft 504 carries a gear 505 that rotates with it and with the gear 503. The gear 505 drives, through a further reduction stage, a driven gear 506 that is fixed with the axle shaft 205. Hence, a two step down transmission is provided with this embodiment but wherein the rear wheel 66 rotates in an opposite direction to that of the engine crankshaft 97.

Figure 29:
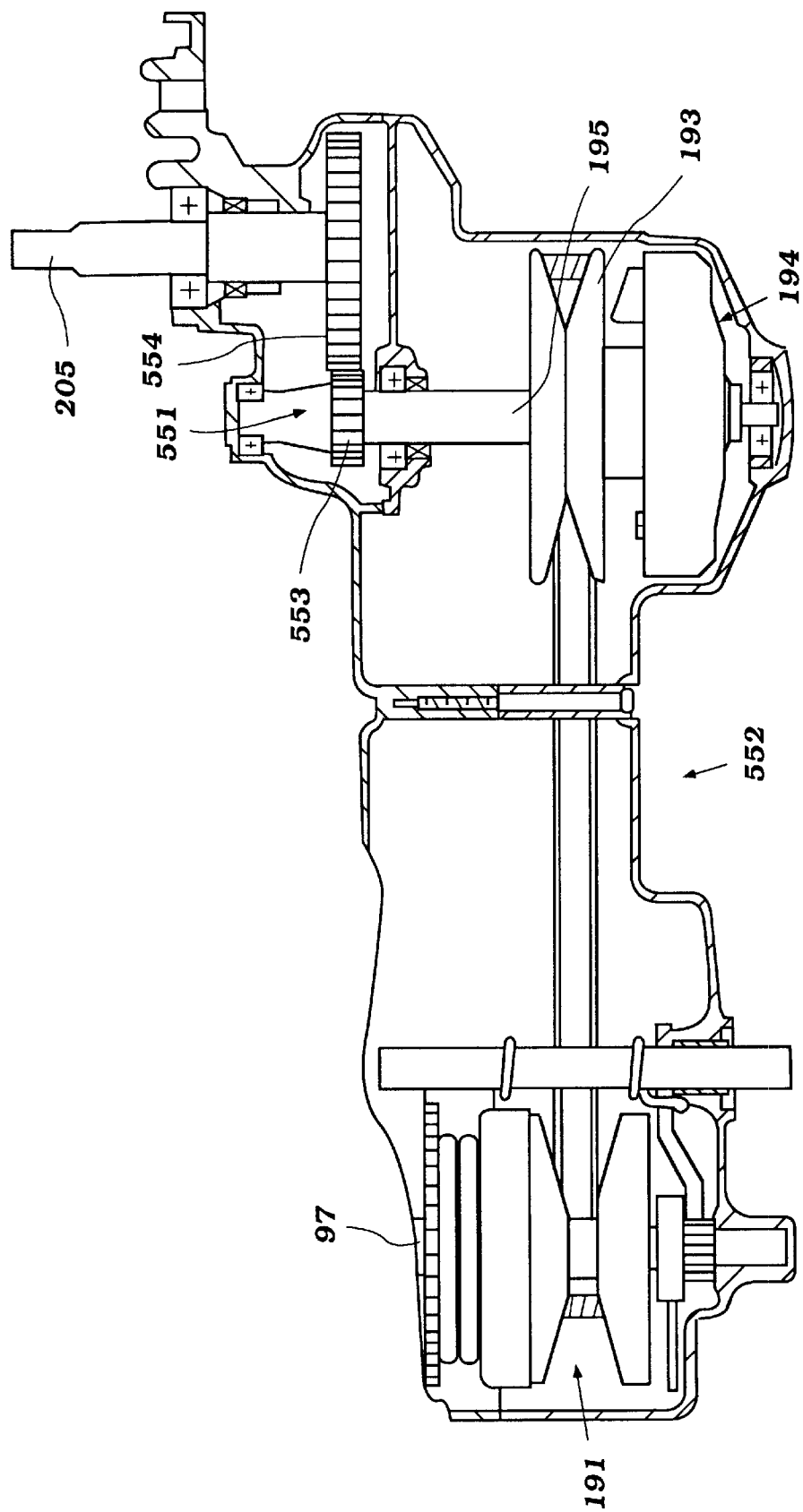
FIG. 29 is a cross-sectional view in part similar to FIGS. 7, 27 and 28 and shows a further transmission embodiment.

FIG. 29 shows a final transmission embodiment which also affects rotation of the rear wheel in a direction opposite to the direction of rotation of the crankshaft. This embodiment includes the CVT transmission as in the embodiments of FIGS. 7 and 28 but the output shaft 195 drives the axle shaft 205 through only a single gear reduction transmission, indicated by the reference numeral 551. The total transmission assembly is indicated by the reference numeral 552.

The reduction stage 551 includes a first gear 553 that is fixed for rotation with the shaft 195. The gear 553 drives a second gear 554 that is affixed directly to the axle shaft 205 so as to achieve the counter rotation from the direction of the crankshaft.

From the foregoing description it should be readily apparent that the embodiments of the engine construction illustrated and described are effective in providing a high specific output for a compact engine for various vehicle applications. The engines all have good throttle response because of the use of the double throttle valve arrangement one on the atmospheric side and one on the pressure side. In addition, excess pressure buildup is avoided through the pressure relief system and this will ensure good operation on acceleration and deceleration. Of course, the foregoing description is that of preferred embodiments of the invention and various changes and modifications may be made without departing from the spirit and scope of the invention, as defined by the appended claims.

What is claimed is:

1. A four cycle, crankcase compression, internal combustion engine comprised of a cylinder block having a cylinder bore with a crankcase chamber formed at one end thereof, a cylinder head closing the other end of said cylinder bore, a piston reciprocating in said cylinder bore and forming with said cylinder bore and said cylinder head a combustion chamber, a crankshaft rotatably journalled in said crankcase chamber, a connecting rod coupled to said piston and said crankshaft for transmitting motion therebetween, means for providing a seal between one end of said connecting rod and said piston and between the sides of said connecting rod and the side surfaces of said crankcase chamber, said connecting rod having a portion thereof in sealing engagement with said crankcase during at least a portion of a single rotation of said crankshaft for dividing said crankcase chamber into a variable volume chamber formed solely by said piston, said cylinder bore, said connecting rod, said crankshaft and said crankcase chamber for acting as a positive displacement pump, intake means for admitting an air charge to said crankcase chamber, pressure delivery means for discharging a compressed air charge from said crankcase chamber, said cylinder head having an intake port for serving said combustion chamber, compressor supply means for supplying a compressed charge from said pressure delivery means to said intake port, an exhaust passage formed in said cylinder head for discharging exhaust products from said combustion chamber, a first throttle valve in said intake means for controlling the flow therethrough, a second throttle valve in said compressor supply means for controlling the flow therethrough, and throttle control means for operating each of said throttle valves for effecting movement of said throttle valves in the same direction during at least a part of their movement.

2. A four cycle, crankcase compression, internal combustion engine as set forth in claim 1, wherein a charge former is provided in the intake means for supplying fuel to the intake air charge.

3. A four cycle, crankcase compression, internal combustion engine as set forth in claim 2, wherein the charge former comprises a carburetor.

4. A four cycle, crankcase compression, internal combustion engine as set forth in claim 3, wherein the first throttle valve is a part of the carburetor.

5. A four cycle, crankcase compression, internal combustion engine as set forth in claim 1, wherein there is further provided a bypass passage extending between the intake means and the compressor supply means and a third throttle value in said bypass passage for controlling the flow therethrough.

6. A four cycle, crankcase compression, internal combustion engine as set forth in claim 5 wherein there is further provided means for operating each of the first and said third throttle valves for effecting movement of said first and said third throttle valves in opposite directions during at least a part of the movement of said first throttle valve in at least one direction.

7. A four cycle, crankcase compression, internal combustion engine as set forth in claim 6, wherein a charge former is provided in the intake means for supplying fuel to the intake air charge.

8. A four cycle, crankcase compression, internal combustion engine as set forth in claim 7, wherein the charge former comprises a carburetor.

9. A four cycle, crankcase compression, internal combustion engine as set forth in claim 8, wherein the first throttle valve is a part of the carburetor.

10. A four cycle, crankcase compression, internal combustion engine comprised of a cylinder block having a cylinder bore with a crankcase chamber formed at one end thereof, a cylinder head closing the other end of said cylinder bore, a piston reciprocating in said cylinder bore and forming with said cylinder bore and said cylinder head a combustion chamber, a crankshaft rotatably journalled in said crankcase chamber, a connecting rod coupled to said piston and said crankshaft for transmitting motion therebetween, means for providing a seal between one end of said connecting rod and said piston and between the sides of said connecting rod and the side surfaces of said crankcase chamber, said connecting rod having a portion thereof in sealing engagement with said crankcase during at least a portion of a single rotation of said crankshaft for dividing said crankcase chamber into a variable volume chamber formed solely by said piston, said cylinder bore, said connecting rod, said crankshaft and said crankcase chamber for acting as a positive displacement pump, intake means for admitting an air charge to said crankcase chamber, pressure delivery means for discharging a compressed air charge from said crankcase chamber, said cylinder head having an intake port for serving said combustion chamber, compressor supply means for supplying a compressed charge from said pressure delivery means to said intake port, an exhaust passage formed in said cylinder head for discharging exhaust products from said combustion chamber, a bypass passage extending between said intake means and said compressor supply means, a first throttle valve in said intake means for controlling the flow therethrough, a second throttle valve in said bypass passage for controlling the flow therethrough, and throttle control means for operating each of said throttle valves for effecting movement of said throttle valves in opposite directions during at least a part of the movement of said first throttle valve in at least one direction.

11. A four cycle, crankcase compression, internal combustion engine as set forth in claim 10, wherein a charge former is provided in the intake means for supplying fuel to the intake air charge.

12. A four cycle, crankcase compression, internal combustion engine as set forth in claim 11, wherein the charge former comprises a carburetor.

13. A four cycle, crankcase compression, internal combustion engine as set forth in claim 12, wherein the first throttle valve is a part of the carburetor.

14. A four cycle, crankcase compression, internal combustion engine as set forth in claim 13, wherein the bypass passage communicates with the intake means downstream of the carburetor.

* * * * *